US012705897B2

(12) United States Patent
Chao et al.

(10) Patent No.: US 12,705,897 B2
(45) Date of Patent: Aug. 11, 2026

(54) TECHNIQUES FOR ANALYZING AND MAPPING GEOGRAPHIC AREAS USING UAS

(71) Applicant: University of Kansas, Lawrence, KS (US)

(72) Inventors: Haiyang Chao, Lawrence, KS (US); Saket Gowravaram Navalur, Lawrence, KS (US); Zhenghao Lin, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 66 days.

(21) Appl. No.: 18/426,303

(22) Filed: Jan. 29, 2024

(65) Prior Publication Data

US 2024/0257524 A1 Aug. 1, 2024

Related U.S. Application Data

(60) Provisional application No. 63/441,740, filed on Jan. 27, 2023.

(51) Int. Cl.
*G06V 20/52* (2022.01)
*G06V 10/764* (2022.01)
(Continued)

(52) U.S. Cl.
CPC ............ *G06V 20/52* (2022.01); *G06V 10/764* (2022.01); *G06V 20/17* (2022.01); *G06V 20/44* (2022.01)

(58) Field of Classification Search
None
See application file for complete search history.

(56) References Cited

U.S. PATENT DOCUMENTS

2022/0130145 A1* 4/2022 Connary ................ G05D 1/101
2022/0398840 A1* 12/2022 Dhawan .................. G08G 5/80
(Continued)

FOREIGN PATENT DOCUMENTS

WO WO-2022226695 A1 * 11/2022 ............ G01J 5/0018

OTHER PUBLICATIONS

Gollner, M. et al. "Towards data-driven operational wildfire spread modeling: A report of the NSF-funded WIFIRE workshop," University of California, San Diego, Technical Report, Jan. 2015, 35 pages.

(Continued)

*Primary Examiner* — Heather R Jones
(74) *Attorney, Agent, or Firm* — Riverside Law LLP

(57) ABSTRACT

The present disclosure provides systems and methods for extracting information from image data captured using an unmanned aircraft system (UAS). The disclosed systems and methods may capture image data using an imaging device mounted to the UAS, which may include a plurality of images of an environment. Each image may be associated with a particular area of the environment and a timestamp. The imagery may be used to construct one or more multi-temporal orthomosaics. The disclosed systems and methods may generate information representative of a dynamic evolution of an event impacting the environment over time based on the multi-temporal orthomosaic(s). The systems and methods may also calculate a rate of spread (ROS) of the event based on the information representative dynamic evolution of an event impacting the environment over time. In an additional aspect, techniques for synchronizing image data captured by the UAS to calibrated image data are disclosed.

18 Claims, 14 Drawing Sheets

(51) Int. Cl.
*G06V 20/17* (2022.01)
*G06V 20/40* (2022.01)

(56) References Cited

U.S. PATENT DOCUMENTS

2022/0405908 A1* 12/2022 Cowan ................. G06V 20/188
2024/0046640 A1* 2/2024 Zhou ...................... G06V 40/10

OTHER PUBLICATIONS

Rothermel, Richard C. A Mathematical Model for Predicting Fire Spread in Wildland Fuels. Intermountain Forest & Range Experiment Station, Forest Service, U.S. Department of Agriculture, Research Paper INT-115, Jan. 1972, 48 pages.
Cruz, M. G. et al. (2015) A Guide to Rate of Fire Spread Models for Australian Vegetation. Australasian Fire & Emergency Service Authorities, 144 pages.
Mell, W. E. et al. "Wildland fire behavior modeling: perspectives, new approaches and applications," in Proceedings of 3rd Fire Behavior and Fuels Conference, Spokane, Washington, USA, Oct. 2010, 16 pages.
Scott, Joe H. et al. Standard Fire Behavior Fuel Models: A Comprehensive Set for Use with Rothermel's Surface Fire Spread Model. General Technical Report RMRS-GTR-153, U.S. Department of Agriculture, Forest Service, Rocky Mountain Research Station, Jun. 2005, 80 pages.
Cheney, N. P. et al. "Prediction of fire spread in grasslands," International Journal of Wildland Fire, vol. 8, Issue 1, 1998, pp. 1-13, 13 pages.
Noble, I. R. et al. "McArthur's fire-danger meters expressed as equations," Australian Journal of Ecology, vol. 5, Issue 2, 1980, pp. 201-203, 3 pages.
Cheney, N. P. et al. "The influence of fuel, weather and fire shape variables on fire-spread in grasslands," International Journal of Wildland Fire, vol. 3, Issue 1, 1993, pp. 31-44, 14 pages.
National Wildfire Coordinating Group (NWCG). [Online]. Available: https://www.nwcg.gov/about-us, 2025, 2 pages.
Finney, M. A. et al. "An examination of fire spread thresholds in discontinuous fuel beds," International Journal of Wildland Fire, vol. 19, Issue 2, 2010, pp. 163-170, 8 pages.
Marino, E. et al. "Fuel bulk density and fuel moisture content effects on fire rate of spread: A comparison between FIRETEC model predictions and experimental results in shrub fuels," Journal of Fire Sciences, vol. 30, Issue 4, 2012, pp. 277-299, 23 pages.
Schroeder, W. et al. "Validation of GOES and MODIS active fire detection products using ASTER and ETM+ data," Remote Sensing of Environment, vol. 112, Issue 5, 2008, pp. 2711-2726, 16 pages.
Csiszar, I. A. et al. "Validation of active fire detection from moderate-resolution satellite sensors: the MODIS example in northern Eurasia," IEEE Transactions on Geoscience and Remote Sensing, vol. 44, Issue 7, Jul. 2006, pp. 1757-1764, 8 pages.
Csiszar, I. et al. "Active fires from the Suomi NPP visible infrared imaging radiometer suite: product status and first evaluation results," Journal of Geophysical Research: Atmospheres, vol. 119, Issue 2, 2014, pp. 803-816, 14 pages.
Badarinath, K. V. S. et al. "Forest fire monitoring and burnt area mapping using satellite data: A study over the forest region of Kerala State, India," International Journal of Remote Sensing, vol. 32, Issue 1, Jan. 2011, pp. 85-102, 18 pages.
Stow, D. A. et al. "Measuring fire spread rates from repeat pass airborne thermal infrared imagery," Remote Sensing Letters, vol. 5, Issue 9, 2014, pp. 803-812, 11 pages.
Allison, R. S. et al. "Airborne optical and thermal remote sensing for wildfire detection and monitoring," Sensors, vol. 16, Issue 8, 2016, 29 pages.
Riggan, P. J. et a. "Remote measurement of energy and carbon flux from wildfires in Brazil," Ecological Applications, vol. 14, Issue 3, 2004, pp. 855-872, 18 pages.
Viedma, O. et al. "Disentangling the role of prefire vegetation vs. burning conditions on fire severity in a large forest fire in SE Spain," Remote Sensing of Environment, vol. 247, 111891, 2020, 17 pages.
Ononye, A. E. et al. "Automated extraction of fire line parameters from multispectral infrared images," Remote Sensing of Environment, vol. 108, 2007 pp. 179-188, 10 pages.
McKenna, P. et al. "Measuring fire severity using UAV imagery in semi-arid central Queensland, Australia," International Journal of Remote Sensing, vol. 38, Issue 14, 2017, pp. 4244-4264, 21 pages.
Beachly, E. et al. "UAS-Rx interface for mission planning, fire tracking, fire ignition, and real-time updating," in 2017 IEEE International Symposium on Safety, Security and Rescue Robotics (SSRR). IEEE, Oct. 2017, pp. 67-74, 8 pages.
Gowravaram, S. et al. "Wildland fire monitoring and mapping using orthorectified near-infrared and thermal UAS imagery," in 101st American Meteorological Society Annual Meeting. AMS, 2021, 5 pages.
Gowravaram, S. et al. "Prescribed grass fire evolution mapping and rate of spread measurement using orthorectified thermal imagery from a fixed-wing UAS," International Journal of Remote Sensing, vol. 43, Issue 7, 2022 pp. 2357-2376, 20 pages.
Khanan, S. et al. "An overview of current and potential applications of thermal remote sensing in precision agriculture," Computers and Electronics in Agriculture, vol. 139, 2017, pp. 22-32, 11 pages.
Gowravaram, S. et al. "Spectral reflectance estimation of UAS multispectral imagery using satellite cross-calibration method," Photogrammetric Engineering & Remote Sensing, vol. 87, Issue 10, Oct. 2021, pp. 735-746, 12 pages.
Gowravaram, S. et al. "UAS-based multispectral remote sensing and NDVI calculation for post disaster assessment," in 2018 International Conference on Unmanned Aircraft Systems (ICUAS). IEEE, 2018, pp. 684-691, 8 pages.
Burnett, J. D. et al. "A low-cost near-infrared digital camera for fire detection and monitoring," International Journal of Remote Sensing, vol. 39, Issue 3, 2017, pp. 741-753, 13 pages.
Akhloufi, M. A. et al. "Multiple spectrum vision for wildland fires," Proceedings, Thermosense: Thermal Infrared Applications XL, vol. 10661, May 2018, 12 pages.
The University of Kansas, (2025) Kansas Biological Survey & Center for Ecological Research. [Online]. Available: https://biosurvey.ku.edu/field-station, 9 pages.
Pyne, S. J. et al. (1996). Introduction to Wildland Fire. John Wiley and Sons, 40 pages.
Stow, D. et al. "Assessing uncertainty and demonstrating potential for estimating fire rate of spread at landscape scales based on time sequential airborne thermal infrared imaging," International Journal of Remote Sensing, vol. 40, Issue 13, 2019, pp. 4876-4897, 22 pages.
United States Department of Agriculture, National Agriculture Imagery Program (NAIP) Information Sheet, May 2009, [Online] https://www.fsa.usda.gov/Internet/FSA_File/naip_2009_info_final.pdf, 2 pages.
Mathworks, "Edge detection," 2022, [Online] https://www.mathworks.com/help/images/edge-detection.html, 2 pages.
Schreck, Mary-Beth et al. "Adapting Australia's grassland fire danger index for the United States' central plains," National Weather Service, Central Region Technical Attachment, No. 10-02, May 2010, [Online] https://www.weather.gov/media/crh/publications/TA/TA_1002.pdf, 19 pages.
Valero, M. M. et al. "Thermal Infrared Video Stabilization for Aerial Monitoring of Active Wildfires," IEEE Journal of Selected Topics in Applied Earth Observations and Remote Sensing, vol. 14, 2021, pp. 2817-2832, 16 pages.

* cited by examiner

TECHNIQUES FOR ANALYZING AND MAPPING GEOGRAPHIC AREAS USING UAS

CROSS-REFERENCE TO RELATED APPLICATIONS

The present application claims the benefit of priority from U.S. Provisional Application No. 63/441,740 filed Jan. 27, 2023 and entitled "TECHNIQUES FOR ANALYZING AND MAPPING GEOGRAPHIC AREAS USING UASs," the disclosure of which is incorporated by reference herein in its entirety.

TECHNICAL FIELD

This invention was made with government support under contract no. 2019-67021-28992 awarded by US Department of Agriculture. The government has certain rights in the invention.

BACKGROUND

Accurate assessment of damage caused by natural disasters such as tornadoes, hailstorms or wildfires is critical for land restoration and disaster mitigation. This, however, can be very challenging to achieve during or immediately after a disaster event. A major reason for such challenges is the lack of reliable high-spatiotemporal-resolution imaging capabilities. Current technologies rely largely on satellite observations of an impacted area to quantify disaster damage, which are often limited by coarse spatial and temporal resolutions (e.g., every several hours at 250-1000 meters (m) for MODIS) and missing observations due to clouds. These limitations may cause difficulties in acquiring fine spatial details of damage to, and timely observations of, the impacted area. Therefore, satellite imagery may not be well suited for tracking or monitoring the spread of the natural disaster (e.g., tracking a tornado, hailstorm, wildfire, etc.) in near real-time. Some of these limitations can be overcome by high-altitude airborne imagery from platforms such as the National Agriculture Imagery Program (NAIP), however, there are many challenges such as operation cost, weather conditions, and risk to pilots and crew members in dangerous environments. UAS can overcome most of the above-mentioned difficulties and provide an option for fast, accurate, and close observations of an ongoing or recently-occurred disaster event, due to their relatively cheaper cost and remote operation (uncrewed) capabilities, small size of equipment, easy handling qualities, and faster turnaround time.

SUMMARY

The present disclosure provides systems and methods for extracting information from image data captured using an UAS. The disclosed systems and methods may capture image data using an imaging device mounted to the UAS, which may include a plurality of images of an environment. Each image may be associated with a particular area of the environment and a timestamp. The imagery may be used to construct one or more multi-temporal orthomosaics. The disclosed systems and methods may generate information representative of a dynamic evolution of an event impacting the environment over time based on the multi-temporal orthomosaic(s). The systems and methods may also calculate a rate of spread (ROS) of the event based on the information representative dynamic evolution of an event impacting the environment over time. In an additional aspect, techniques for synchronizing image data captured by the UAS to calibrated image data are disclosed.

In an aspect, a method includes collecting, by an UAS, a plurality of repeat-pass time-sequential images of an environment. Each image of the plurality of repeat-pass time-sequential images may associated with a particular area of the environment and a timestamp to form time-labeled image grids. The method includes constructing, by one or more processors, one or more multi-temporal orthomosaics based on the plurality of repeat-pass time-sequential images. The method includes generating, by the one or more processors, information representative of a dynamic evolution of an event impacting the environment over time. The event may be a tornado, a fire, a hailstorm, an earthquake, another type of event, or a combination thereof. The method includes calculating, by the one or more processors, a rate of spread (ROS) of the event based on the information representative dynamic evolution of an event impacting the environment over time.

In situations where the event is a fire, the method may include extracting a fire front from each of the one or more multi-temporal orthomosaics and determining the ROS based at least in part on the fire fronts. The fire front may be extracted from each of the one or more multi-temporal orthomosaics using intensity variance thresholding. The intensity variance thresholding may include generating a grid of pixels for each of the one or more multi-temporal orthomosaics; classifying each pixel of the grid of pixels as representing the fire front or not representing the fire front; extracting the pixels classified as representing the fire front to produce an initial fire front; and performing delineation on the initial fire front to obtain the fire front. Classifying the pixels may be based on a threshold determined using a pixel intensity metric obtained from the grid of pixels, based on a range of pixel intensity values determined using the grid of pixels, or both. The ROS may be determined based on a plurality of fire fronts extracted from the one or more multi-temporal orthomosaics. In an aspect, the method may include generating a fire evolution map based on the extracted fire front. In an aspect, the method may include registering an area of the one or more multi-temporal orthomosaics with respect to a calibrated image. In an aspect, the calibrated image may be enhanced based on image content included in at least one of the one or more multi-temporal orthomosaics.

In an aspect, a non-transitory computer-readable storage medium storing instructions that, when executed by one or more processors, cause the one or more processors to perform operations is disclosed. The operations include receiving a plurality of repeat-pass time-sequential images of an environment collected by an unmanned aircraft system. Each image of the plurality of repeat-pass time-sequential images may be associated with a particular area of the environment and a timestamp. The operations may include constructing one or more multi-temporal orthomosaics based on the plurality of repeat-pass time-sequential images and generating information representative of a dynamic evolution of an event impacting the environment over time. The operations may also include calculating, by the one or more processors, a ROS of the event based on the information representative dynamic evolution of an event impacting the environment over time.

In an aspect, the event may be a tornado, a fire, a hailstorm, an earthquake, another type of event, or a combination thereof. Where the event is a fire, the operations may include extracting a fire front from each of the one or more multi-temporal orthomosaics and determining the ROS based at least in part on the fire fronts. The fire front may be extracted from each of the one or more multi-temporal orthomosaics using intensity variance thresholding. The intensity variance thresholding may include generating a grid of pixels for each of the one or more multi-temporal orthomosaics, classifying each pixel of the grid of pixels as representing the fire front or not representing the fire front, extracting the pixels classified as representing the fire front to produce an initial fire front, and performing delineation on the initial fire front to obtain the fire front. The classifying may be based on a threshold determined using a pixel intensity metric obtained from the grid of pixels or based on a range of pixel intensity values determined using the grid of pixels. In an aspect, the ROS may be determined based on a plurality of fire fronts extracted from the one or more multi-temporal orthomosaics. The operations may include generating a fire evolution map based on the extracted fire front. In an aspect, the operations may include registering an area of the one or more multi-temporal orthomosaics with respect to a calibrated image. In an aspect, the operations may include enhancing the calibrated image based on image content included in at least one of the one or more multi-temporal orthomosaics.

In an aspect, a system includes a memory and one or more processors communicatively coupled to the one or more processors. The one or more processors may be configured to receive image information corresponding to a plurality of repeat-pass time-sequential images of an environment captured by an UAS. Each image of the plurality of repeat-pass time-sequential images may associated with a particular area of the environment and a timestamp to form time-labeled image grids. The one or more processors may be configured to construct one or more multi-temporal orthomosaics based on the plurality of repeat-pass time-sequential images. The one or more processors may be configured to generate information representative of a dynamic evolution of an event impacting the environment over time. The event may be a tornado, a fire, a hailstorm, an earthquake, another type of event, or a combination thereof. The one or more processors may be configured to calculate a rate of spread (ROS) of the event based on the information representative dynamic evolution of an event impacting the environment over time.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
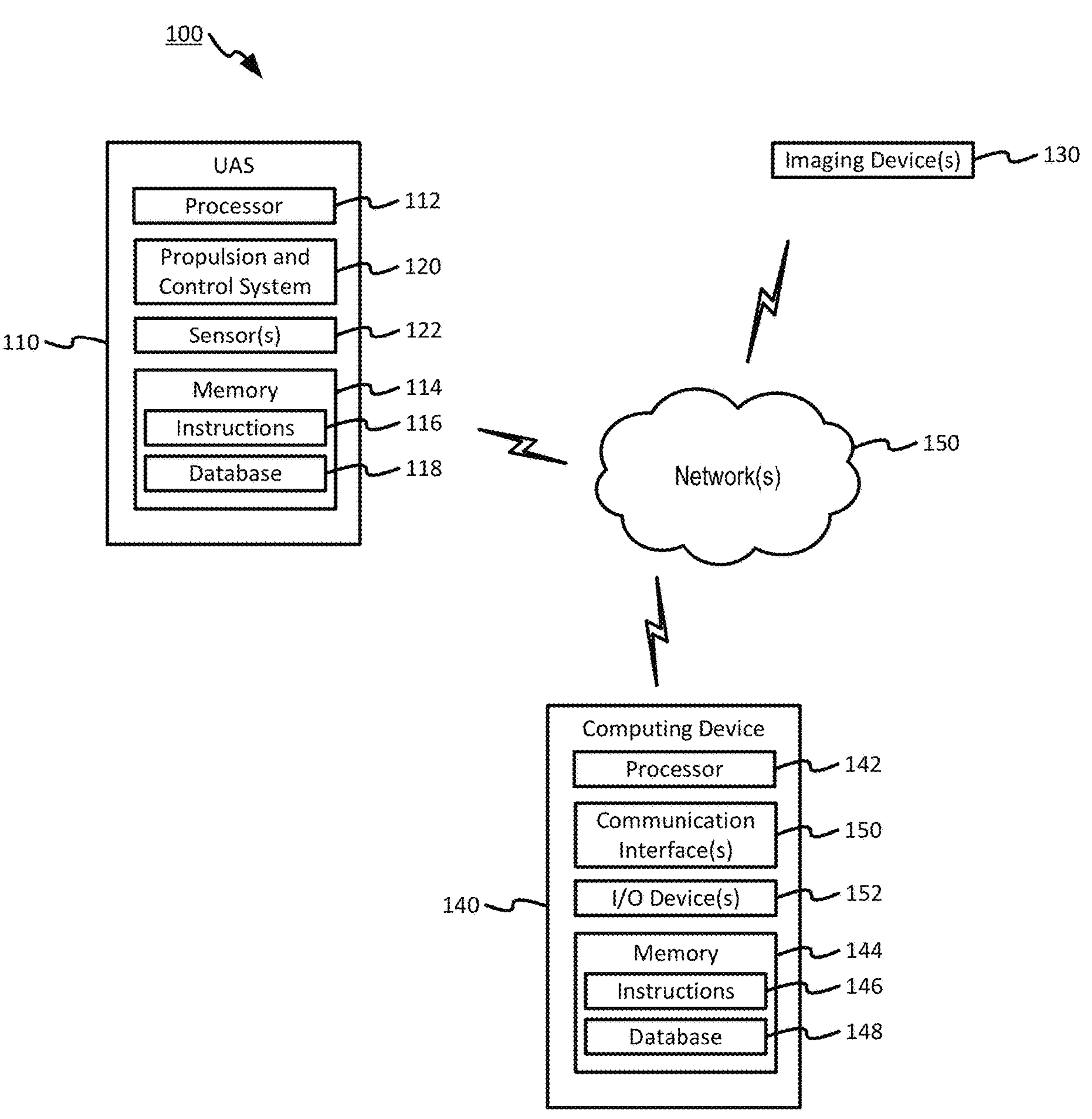
FIG. 1 is a block diagram of an exemplary system for analyzing and mapping geographic areas using UAS in accordance with aspects of the present disclosure.

Referring to FIG. 1, a block diagram of a system for analyzing and mapping geographic areas using UAS in accordance with aspects of the present disclosure is shown as a system 100. As shown in FIG. 1, the system 100 includes a UAS 110. In an embodiment, the UAS 110 may be an aircraft adapted to navigate from a point of origin to a destination via the air. In an additional or alternative embodiment, the UAS 110 may be watercraft adapted to navigate from the point of origin to the destination via a body water (e.g., to assess damage to underwater structures and equipment following an earthquake, tsunami, or other water-based event), which may include watercraft designed to travel along the surface of the water, watercraft designed to travel beneath the surface of the water (e.g., a submersible watercraft), or a watercraft designed to travel both along the surface and below the surface of the water. In yet another additional or alternative embodiment, the UAS 110 may be a land-based vehicle designed to navigate from the point of origin to the destination via the ground. In still another additional or alternative embodiment, the UAS 110 may be a vehicle designed to travel using two or more mediums such as air, water, and land. For example, the UAS 110 may be a hovercraft adapted for navigation over both water and land.

The UAS 110 may include one or more processors 112, a memory 114, a propulsion and control (PAC) system 120, and one or more sensors 122. The one or more processors 112 may include central processing units (CPUs), graphics processing units (GPUs), digital signal processors (DSPs), application specific integrated circuits (ASICs), or other circuitry and logic configured to support operations of a UAS in accordance with the concepts disclosed herein. It is noted that the processor(s) 112 may include multi-core processors having two or more processing cores. The memory 114 may include read only memory (ROM), random access memory (RAM), flash memory, magnetoresistive random access memory (MRAM), one or more hard disk drives (HDDs), one or more solid state drives (SSDs), other forms of memory configured to store information in a persistent and/or non-persistent state, or any combination thereof. The memory 114 may store instructions 116. The instructions 116, when executed by the one or more processors 112, cause the one or more processor 112 to perform the operations described in connection with the UAS 110 with reference to FIGS. 1-2 and the Appendix filed concurrently herein with. A database 118 may be stored at the memory 114. The database 118 may store information that may be used to aid in the navigation of the UAS 110, such as flight plan data, satellite or UAS imaging data that has been calibrated to support distance measurements (e.g., 1 pixel=0.1 meter (m) 1 m, 50 m, 100 m, 250 m, 500 m, 1000 m, etc.), or other types of information, such as information captured by the one or more sensors 122.

The PAC system 120 may include various control systems (e.g., steering systems, flight management systems, etc.), propulsion systems (e.g., motors, propellers, drive systems, fuel systems, etc.), power systems (e.g., power supply, power transmission relays, generators, etc.), sensors (e.g., an altimeter, a barometer, a pressure sensor, an inertial measurement unit, etc.), and other components adapted to enable the UAS 110 to travel during navigation from the point of origin to the destination. In an embodiment, the database 118 may store plan information that identifies the point of origin and the destination, and the plan information may be accessed by the PAC system 120 during navigation of the UAS 110 from the point of origin to the destination, such as for determining course and heading information, steering the UAS 110, etc. The one or more sensors 122 may include electro-optical imaging sensors (e.g., RGB cameras, etc.), infrared sensors (e.g., near infrared (NIR) sensors), thermal sensors, temperature sensors, wind sensors, or other types of sensors configured to support operations of the UAS 110, such as the sensors referenced above with reference to the PAC 120.

As explained in detail in the examples described below, the system 100 may be configured to support various operations to plan operations for evaluation of a disaster impacted environment, perform the planned operations to obtain data during evaluation, and perform analysis on the obtained data. For example, the UAS 110 may be configured to provide data captured by the one or more sensors 122 to a computing device 140. The data may be transmitted or otherwise provided to the computing device 140 via one or more networks 150 using wired or wireless communication links. Additionally or alternatively, the data may be provided directly to the computing device 140 (e.g., via a serial or universal serial bus (USB) link, a wireless communication link, and the like). The computing device 110 may also receive imaging data from other imaging sources, such as satellite imaging data from one or more satellite imaging sources or other aircraft (or other types of vehicles) sources (e.g., jets or other high-altitude aircraft).

Figure 18:
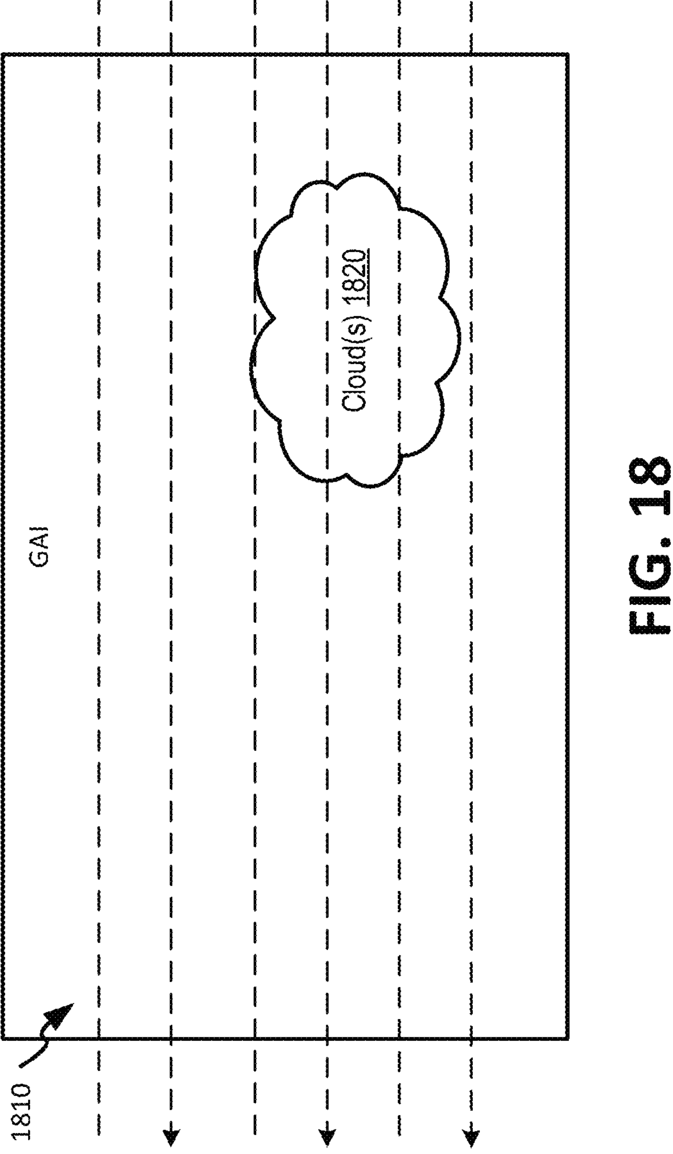
FIG. 18 is a block diagram illustrating exemplary image processing techniques for analyzing a geographic area in accordance with aspects of the present disclosure.

As a non-limiting example, and referring to FIG. 18, a block diagram illustrating exemplary aspects of analyzing a geographic area using the techniques disclosed herein is shown. In particular, FIG. 18 shows a geographic area of interest (GAI) 1810, which could a field (e.g., a grass field, a crop field, etc., a neighborhood, a forest of portion thereof, a beach, and the like. When events occur, it may be desired to monitor and measure the impact of events on the GAI 1810. For example, when a wildfire or hailstorm occurs, it may be desirable to measure the area that was impacted by the wildfire or hailstorm, such as for estimating an area of the GAI 1810 that may be burned by the wildfire or damaged by the hailstorm. In some situations it may also be desirable to monitor the event as it occurs, such as to be able to track movement of the event across the GAI 1810, which may enable operations to combat the event or minimize the damage of the event to be carried out more efficiently, such as to track the spread of a wildfire or measure erosion of a beach in response to a hurricane.

As briefly explained above, satellite images may be periodically captured that cover the GAI 1810, but the spatiotemporal resolution of the satellite images may be less than desirable since such images may be captured only 6 times a day and may not coincide with or provide information regarding the event over time with sufficient temporal resolution to enable tracking of the event over time. For example, in the event of a wildfire occurs, it would be advantageous to have the capability to monitor the progression of the wildfire. This capability enables emergency responders to strategically allocate resources, potentially containing the wildfire and to identify situations where individuals may be at risk. This, in turn, allows for the prompt initiation evacuation procedures. In addition to being insufficient for dynamically changing events, the satellite images may contain missing data. For example, a satellite image of the GAI 1810 may contain missing data based on the presence of one or more clouds 1820 when the satellite was passing over and imaging the GAI 1810. Such occlusions may prevent the satellite data from providing useful information even when captured at a relevant time during the event due to the high-altitude nature of the satellite images.

Using the concepts described herein, image data may be captured using one or more UAS flown over the GAI, as indicated by dashed arrows in FIG. 18, which represent an overlapping flight pattern for a UAS to image the GAI 1810. Such images may be captured while the event is occurring (and possibly before and after the event), thereby providing image data of the GAI 1810 having an appropriate temporal resolution. Moreover, such image data may be captured at higher frequencies (e.g., every 5 minutes, 15 minutes, 30 minutes, 1 hour, 2 hours, etc.) as compared to satellite images, which may facilitate tracking of the event as it occurs. An additional advantage provided by the techniques disclosed herein is that the missing data in satellite images may be supplemented with image data captured by a UAS in accordance with the techniques described herein. For example, a UAS may be flown over all or a portion of the GAI 1810 (e.g., a portion covered by the cloud(s) 1820) and the UAS image data may be used to fill in the missing data in the satellite, thereby enabling the entire GAI 1810 to be observed using image data. Furthermore, while the UAS image data may not be spatially calibrated (e.g., the pixel to distance ratio may vary depending on the altitude of the UAS or other factors), matching techniques may be used to associate UAS-captured image data with corresponding regions in the satellite image data, enabling higher resolution image data captured by the UAS to be used to enhance the lower resolution satellite images (e.g., regions of interest within lower resolution satellite images may be augmented with higher resolution image data captured by a UAS in accordance with the concepts described herein). Such abilities may enable enhancement of satellite image datasets and more accurate assessment of the impact of events on the GAI 1810. It is noted that while primarily described as being beneficial for satellite image enhancement and registration (i.e., synchronizing image data spatially), the concepts described herein may also utilize UAS image data in connection with other types of lower resolution image data, such as image data captured by higher altitude aircraft.

As an illustrative and non-limiting example of how the techniques described in here and briefly discussed above may be utilized, fire spread metrics, such as fire front location and fire rate of spread (ROS), may be critical to understanding fire behavior and to making predictions in their potential behavior changes. These metrics are required for the reconstruction of digital twins of a fire event, data-based fire spread prediction, and the understanding of the impact of atmosphere, terrain, and fuel on the fire behavior. During prescribed and wildfire operations, the fire behaviors can be estimated by empirically designed or physics-based fire models, such as the Rothermel, the CSIRO, and wildland urban interface fire dynamics simulator (WFDS) models. Although these models have been widely used to predict the fire ROS in many fuel types, one of the biggest challenges in their operational use is the lack of ground truth data for evaluation and validation. Additionally, the accuracy and reliability of these models are highly dependent on the quality of weather, fuel, and terrain information during a fire event, which can be difficult to obtain. These concerns can be minimized with the help of direct and accurate fire spread measurements during an active fire event. For example, accurate measurements of fire front location and fire ROS of a benchmark wildland fire can greatly improve the evaluation, validation, and fine-tuning of the existing fire spread models. However, such direct fire measurements can be challenging to acquire, given the complex and highly dynamic nature of fire spread in varying atmospheric and field conditions such as wind, relative humidity, temperature, fuel characteristics, and terrain features.

Many fire ROS measurements in the literature come from indoor observations through table-top and wind tunnel experiments or ground observations through towers or booms, which are limited to small scales and may not accurately depict the fire spread behavior across landscape scales. Remote sensing data can enable the accurate mapping of fire behaviors in larger spatial scales, making them better suited for wildland fire measurements. Although satellite remote sensing plays a vital role in fire monitoring, the coarser spatiotemporal resolutions of most satellite data make them more suited for large fires (lasting more than a day) and applications such as fire hot spot detection and fire damage assessment. Measurements of fire ROS and fire front location of prescribed fires or wildfires that only last a few or several hours can be better facilitated by airborne remote sensing. In fact, it has been suggested that spatial and temporal resolutions of 10 m and 10 min are desired for accurate data-enabled operational wildfire spread modeling and forecasting. These finer resolutions are generally achievable by airborne remote sensing. In fact, most existing remote sensing-based fire ROS measurements use imagery from manned aircraft. The collected airborne imagery can be post-processed for detection and extraction of fire fronts and ROS measurement. However, deploying manned aircraft over fires can be challenging due to adverse flying conditions (smoke and heat), limited flight path flexibility (to avoid turbulence), and high operating costs.

In recent years, small UAS equipped with multispectral cameras are increasingly used in fire missions for applications including post-burn vegetation mapping, fire ignition, and fire detection. However, successful deployment of UAS use for reliable fire ROS measurements are still limited. Small UAS are light-weight, easy to handle, and cost-effective, making them very handy for fire ROS measurements at low altitudes (e.g., less than 122 m Class G airspace in the US). Thermal cameras can be installed on these UAS for fire measurement due to their ability to see through smoke and measure temperature. However, thermal cameras are generally quite expensive and have lower image resolution as compared to RGB and near infrared (NIR) cameras, both of which have been widely used by the UAS multispectral remote sensing community. NIR images can be used for certain fire sensing missions since they are not affected much by smoke occlusion compared with RGB images and can detect a lot more features than typical thermal images which generally have lower pixel resolutions (e.g., 640×512 pixels or lower). However, one challenge for NIR-based fire mapping is that it cannot detect temperature changes directly and may create difficulties in fire front detection. Researchers have worked on NIR-based fire detection using ground images and airborne images. For instance, NIR aerial images may first be converted to Normalized Difference Vegetation Index (NDVI) and then used for fire line detection and extraction.

The objective of the techniques disclosed herein is to provide a low-cost mapping technique that may be used to provide a grass fire and ROS measurement system using NIR aerial images from a fixed-wing UAS. The disclosed techniques may also be applied to other types of mapping and events, as will be apparent from the discussion below. The methods disclosed herein were demonstrated and validated using a low-cost NIR UAS dataset over a prescribed grass fire that was conducted at the University of Kansas Anderson County Prairie Preserve (ACPP) near Welda, KS. As explained in more detail below, the techniques disclosed herein provide:

- A new method for spatiotemporal representation of grass fire evolution by exploring time labeled UAS NIR orthomosaics generated from aerial images with limited footprints.
- A UAS prescribed fire data set over a tallgrass field in Kansas, including short time-series NIR orthomosaics and local weather and terrain measurements.
- A new NIR intensity variance thresholding method for grass fire front classification and extraction.

The disclosed NIR-based mapping techniques may be applied to provide improved fire sensing and monitoring systems, as well as to generate data that can greatly benefit many other researchers, such as:

UAS remote sensing researchers and operators who want to collect grass fire spread data but cannot afford expensive thermal cameras.

Researchers who are interested in using UAS for monitoring and mapping the evolution of other fast-evolving environmental processes such as chemical leaks, flooding, extreme weather, or other events in which spatiotemporal observations may be important.

Wildland fire managers or fire fighters who would like to have accurate predictions of grass fire behavior.

Grass fire behavior researchers and fire spread modeling researchers who need representative grass fire data sets.

Figure 3:
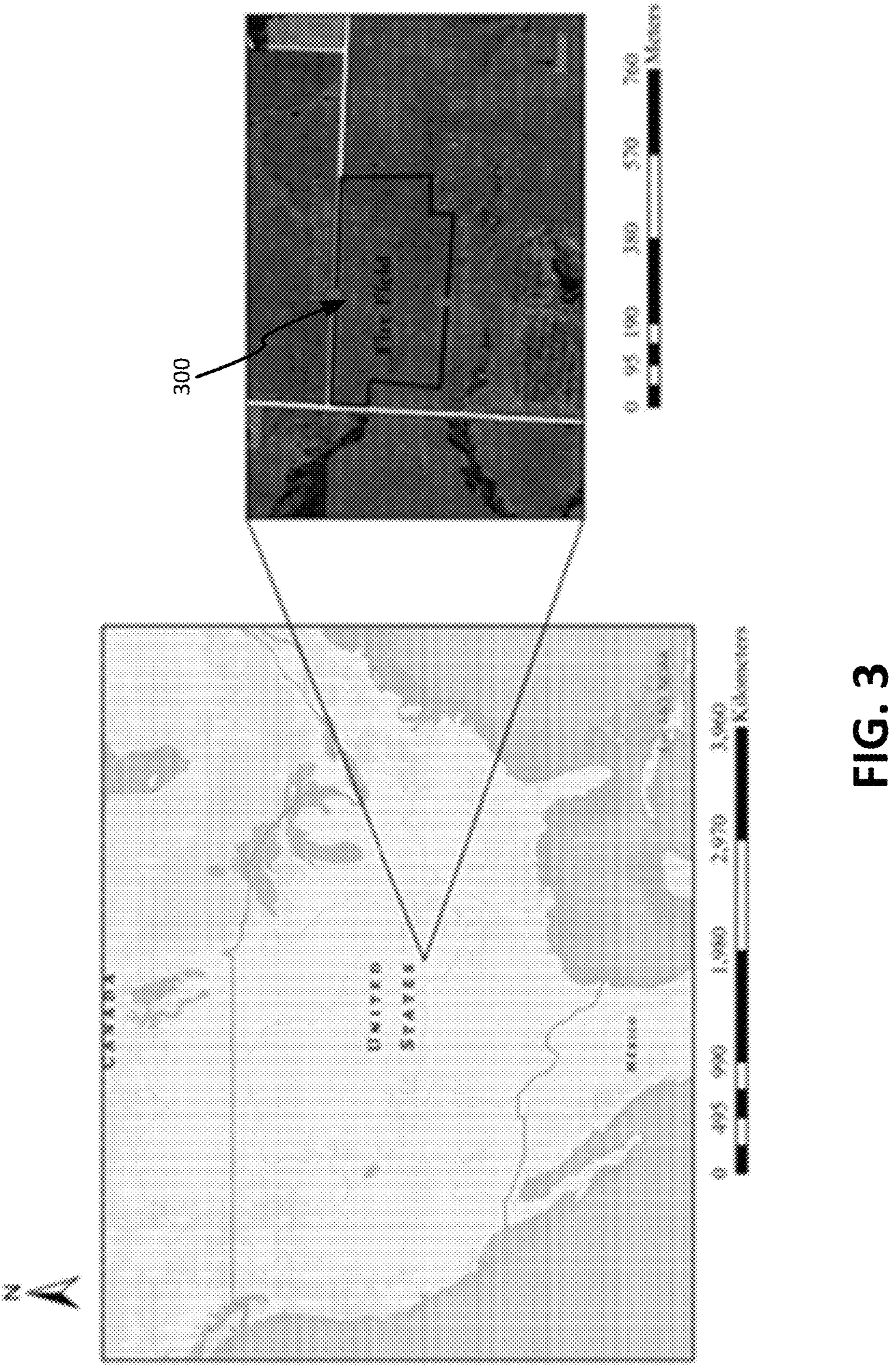
FIG. 3 is an image showing a boundary of a fire field that may be detected using image processing techniques in accordance with aspects of the present disclosure.

As mentioned above, the techniques described herein were tested using a prescribed grass fire data set. Below, a description of the prescribed grass fire and the UAS data that was to demonstrate and analyze the methods proposed herein is described. The prescribed grass fire was conducted from 11:38 AM to 12:25 PM (US Central Time) on Oct. 8, 2019, by the Kansas Biological Survey (KBS) near Welda, KS. The burn site is a relatively flat rectangular field (530 m×250 m) with uniform fuel vegetation cover dominated by C4 tallgrass and a mixture of herbaceous forbs and legumes. A ring fire pattern was conducted by two fire setting teams using drip torches. The fire ignition was initiated near the center of the north boundary and terminated near the center of the south boundary, with one team traveling clockwise and the other traveling counterclockwise. The ignition process was completed at around 12:17:32 PM after which the fire evolved naturally in the field. The boundary of the fire field is shown in FIG. 3. There were some inconsistencies in the fire ignition pattern with the teams having to spend more time to ignite the northeast and northwest corners. The weather conditions during the burn were measured in the field as 73° F. temperature with 41% relative humidity and 6.26 m/s prevailing wind from the south. The wind measurement is from a Campbell Scientific CSAT3B wind anemometer installed at 1.9 m above the ground level close to the east boundary of the fire field.

A KHawk 55 fixed-wing UAS was deployed over the prescribed fire for multispectral image acquisition. The KHawk 55 UAS is a low-cost multispectral remote sensing platform developed by the Cooperative Unmanned Systems Lab (CUSL) at the University of Kansas. It is equipped with a Ublox M8P Here GPS and a Pixhawk Cube autopilot (ArduPilot 2021), which can support both manual and autonomous flight. Key specifications are provided in Table I.

TABLE I

KHawk 55 UAS Specifications

| Description | Value |
|---|---|
| Take-off Weight | 2.5 kg |
| Wingspan | 1.4 m |
| Cruise Speed | 20 m/s |
| Maximum Endurance | 30 min |
| Typical Altitude | 120 m |

Figure 4:
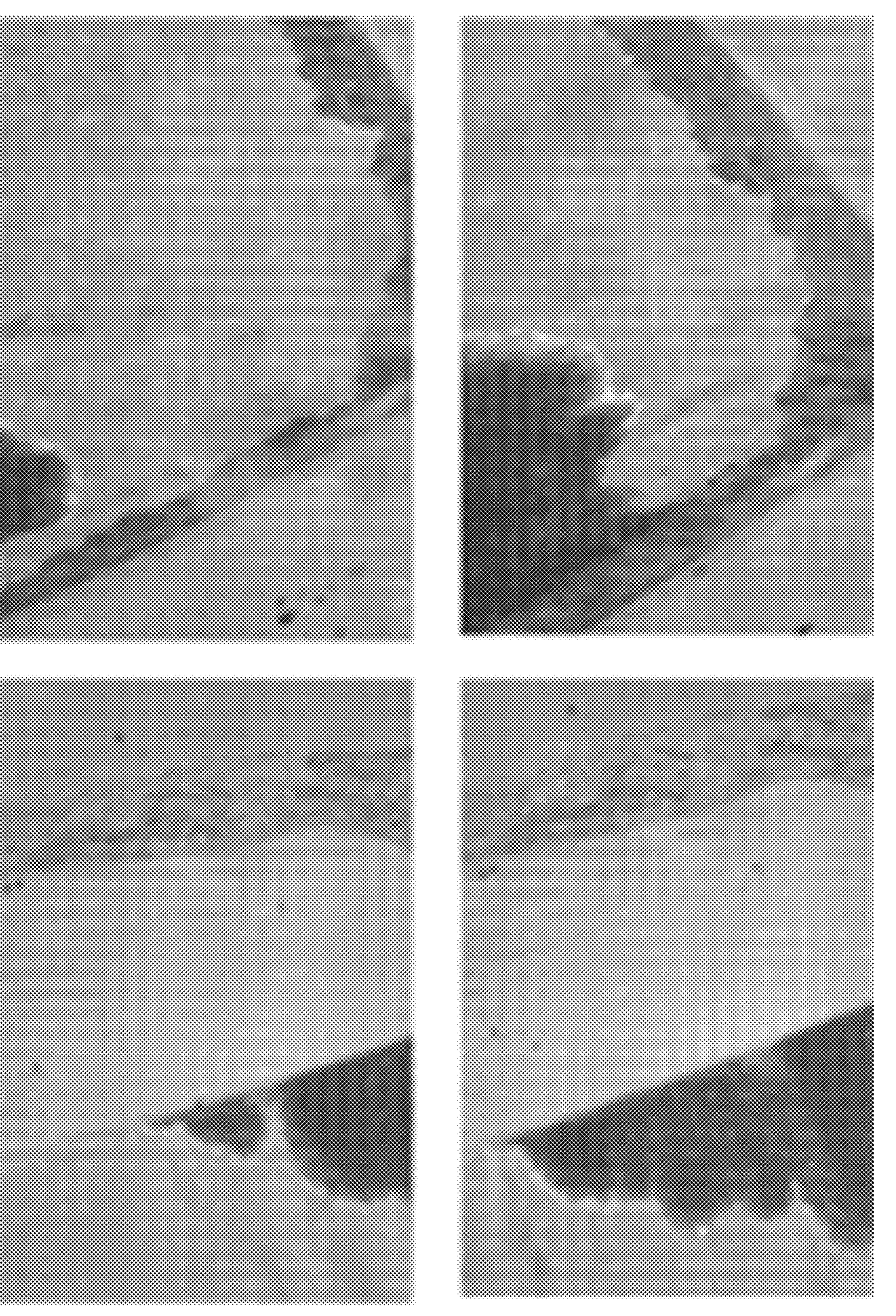
FIG. 4 shows images of an exemplary fire field to which image processing techniques in accordance with aspects of the present disclosure may be applied.

The KHawk UAS was equipped with a low-cost PeauPro82 modified GoPro Hero 4 Black camera for NIR video acquisition. This camera was modified with an 850 nm IR pass filter making it sensitive to light in the NIR spectrum and was operated in a video mode at a frame rate of 29.97 Hz with pixel resolution of 1080×1920 pix respectively (see Table II). Manual synchronization with the GPS logs is performed after the flight for image geotagging. Example images of the fire field are shown in FIG. 4. A KHawk UAS was programmed to fly multiple predetermined loops over the burning field at an altitude that was 120 m above the ground level to collect repeat-pass imagery of the burning field.

TABLE II

PeauPro82 Modified GoPro Hero 4 NIR Camera specifications.

| Description | Value |
|---|---|
| Spectral Bandwidth | 825.4 to 880 nm |
| Sensor Resolution | 1920 × 1080 pix |
| Field-of-View (FOV) | 74° × 45° |
| Frame Rate | 29.97 Hz |
| Spatial Resolution (at 120 m above the ground) | 0.1 m |

Figure 5:
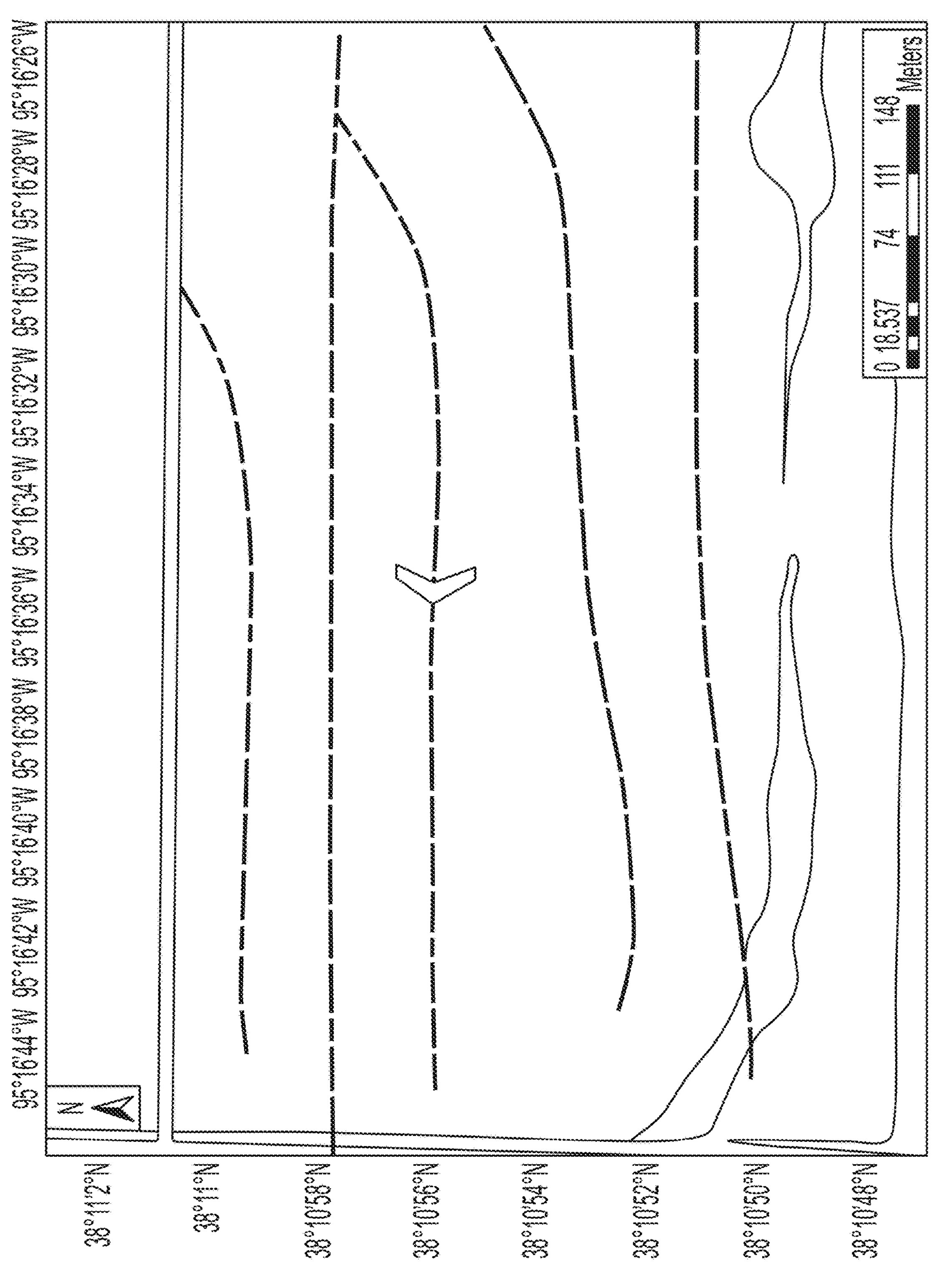
FIG. 5 is a diagram illustrating an exemplary flight path used to evaluate image processing techniques in accordance with aspects of the present disclosure.

It is worth mentioning that the UAS ground control station operator performed real-time adjustments to the predetermined flight path to follow the fire evolution based on ground fire observations. Repeat-pass imagery is defined as the images collected at the same location over the field at different time steps (e.g., capturing a first image of an area at a time t=0 and a second image of the area at a time t=x, where x>0). The objective of such a flight plan is to collect images for the generation of short time-series orthomosaics, where one orthomosaic corresponds to one flight loop. In this mission, the UAS completed one loop for 2 minutes and achieved 4 loops in total from about 12:06 PM to 12:18 PM. Three loops were used for orthomosaic generation to ensure map accuracy. The majority of the UAS flight path is overlaid on a National Agriculture Imagery Program (NAIP) image (spatial resolution of 1 m), shown in FIG. 5. The NAIP image was taken on Jun. 30, 2019, and was used to geometrically register the UAS orthomosaics, using a georeferencing tool, such as ArcGIS. Once registered, higher resolution data captured by the UAS may be mapped to a same region of a lower resolution satellite image, which provides the ability to enhance the resolution of portions of the satellite image data and/or quantify a geographic area within the UAS image data (e.g., calculate an area impacted by an event, such as to calculate a number of acres of crop burned by a wildfire or damaged by a hailstorm or tornado).

Having generally described the techniques used to obtain the UAS image data set to develop and validate the new methods for grass fire evolution mapping and ROS measurement using low-cost NIR images from a small UAS in accordance with aspects of the present disclosure, exemplary details of the methods shall now be described. The first part of the disclosed methods focuses on the spatiotemporal representation of the grass fire evolution using short time-series orthomosaics generated from repeat-pass images with limited footprints. In addition, time labeling is introduced for each grid within an orthomosaic to represent the different time stamps for UAS fire data acquisition. The second part is dedicated to fire front extraction from these orthomosaics using a novel NIR Intensity Variance Thresholding (IVT) method. Finally, these fire fronts are combined to form a fire evolution map that facilitates the calculation of the fire ROS.

Figure 6:
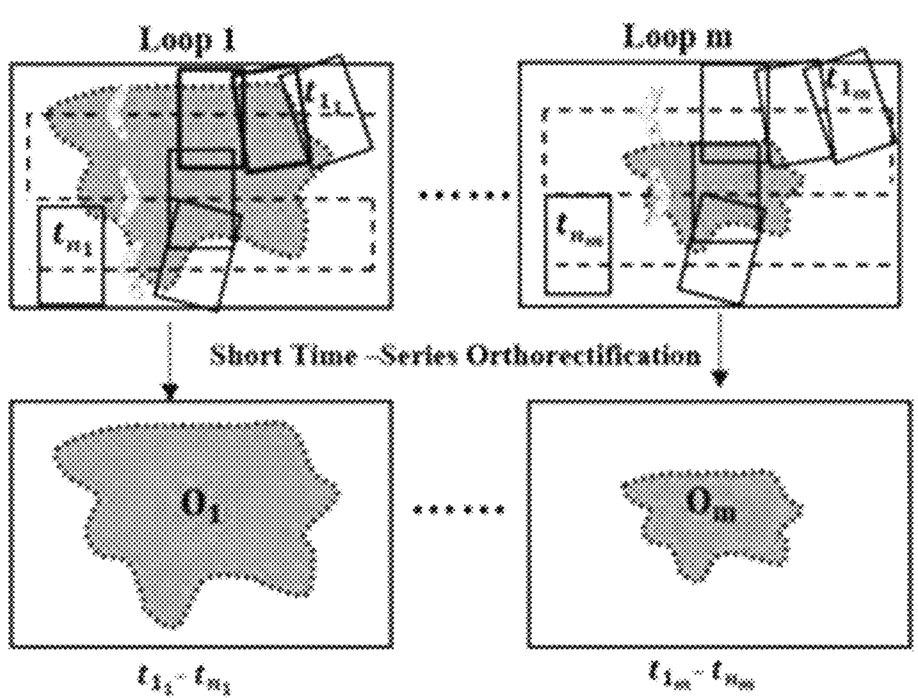
FIG. 6 is a diagram illustrating generation of orthomosaics using time-series images in accordance with aspects of the present disclosure.

As briefly explained above, a small UAS flying at low altitudes generally observes only small patches of an area, such as a burning field, at any given time, which is not ideal for the mapping and measurement of fire spread. Furthermore, those images are not calibrated such that dimensions of the areas depicted in the image may be easily or readily used to calculate metrics associated with the area (e.g., an area of a field impacted by fire spread, etc.). For the spatial representation of the fire spread within a specific duration of time, images from each loop are grouped and orthorectified to form one orthomosaic (e.g., a composite orthomosaic formed from multiple smaller orthomosaics). With the UAS collecting data in multiple loops over the fire field, short time-series orthomosaics can be generated, as shown in FIG. 6.

Figure 7:
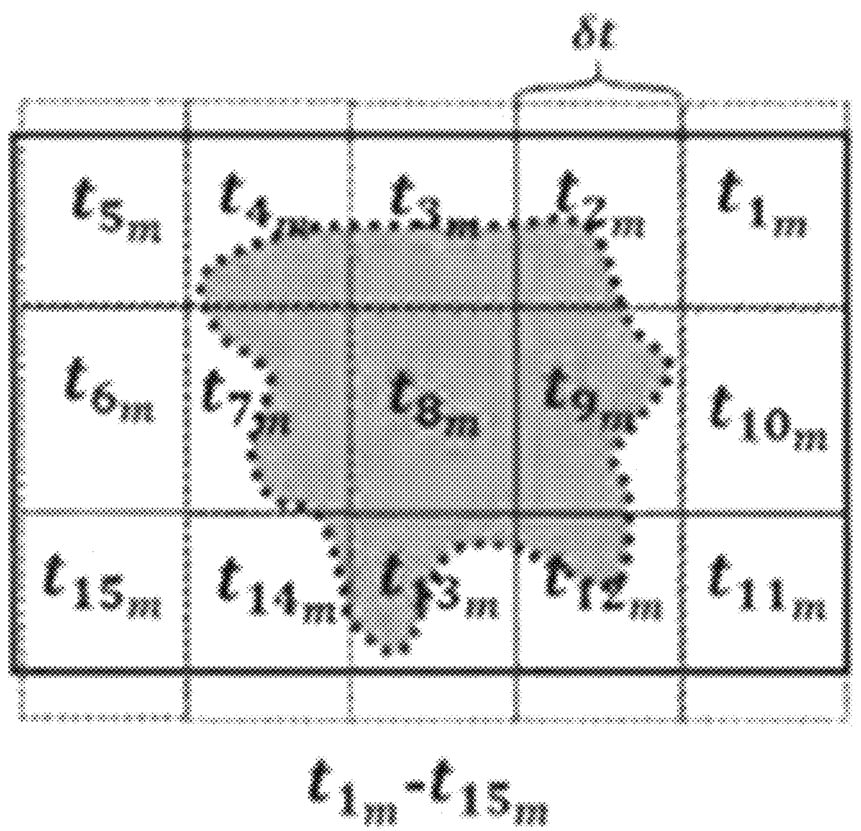
FIG. 7 is a diagram illustrating the concept of time labeling for the generated orthomosaics in accordance with aspects of the present disclosure.

Since each orthomosaic is formed using multiple images collected at different times, a time interval can be assigned to each orthomosaic, where the starting and ending time corresponds to the time stamps of the first and last image in the loop, respectively. This is illustrated in FIG. 6, however, such time representation may not be enough for fire situational awareness and ROS calculation at finer scales. To address this problem, a new data representation is proposed and illustrated with reference to FIG. 7. As shown in FIG. 7, instead of using only one time step to represent the data acquisition time information for an orthomosaic, the orthomosaic will be divided into small zones with their own time labels, shown as $t_{1m}$-$t_{15m}$. In an aspect, a size of each time zone and a time difference between the time zones can be customized based on the desired temporal resolution, camera footprint, and flight plan (e.g., based on an overlapping percentage and ground speed of the UAS or other parameters).

Given the UAS altitude of h above the ground and camera FOV of $\theta_x$ and $\theta_y$, the size of one time zone in the orthomosaic can be computed according to Equation 1:

$$O_{m_t} = 2kh\ \tan\frac{\theta_x}{2} \times 2kh\ \tan\frac{\theta_y}{2}, \tag{1}$$

where k is the scaling ratio between 0 and 1. The generated orthomosaics can then be analyzed for fire front detection, extraction, and later fire evolution map generation, as described in more detail below.

Figure 8:
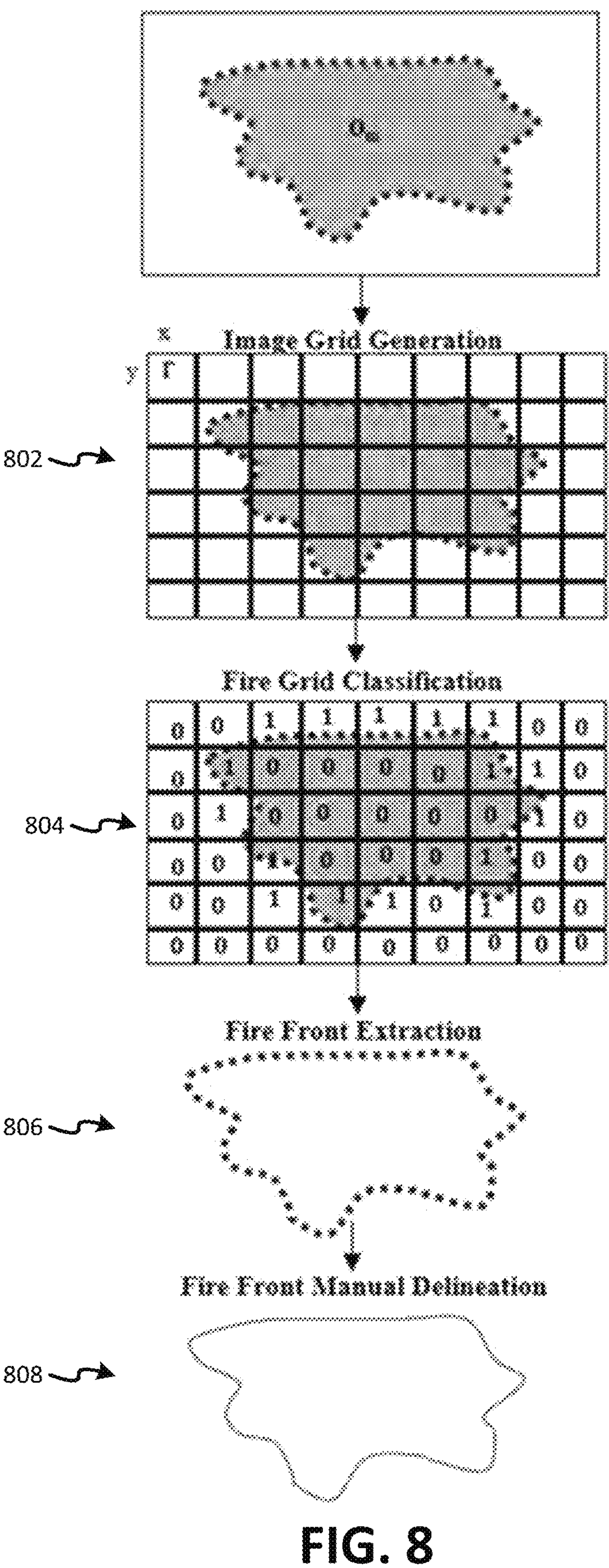
FIG. 8 is a diagram illustrating an image processing technique for boundary detection in accordance with the present disclosure.

To solve the above-described fire front extraction problem based on airborne NIR imagery, a technique referred to herein as NIR Intensity Variance Thresholding (IVT) is disclosed. Given an NIR DN orthomosaic $O_m$ with a size of X×Y pixels, the IVT method can be used to identify and extract the pixels that represent the fire front, $O_m$f. The disclosed method can generally be categorized into three steps: 1) image grid generation and fire grid classification (images 802, 804, respectively); 2) fire front extraction (image 806); and 3) fire front delineation (image 808), as illustrated in FIG. 8. An advantage of this methodology is the use of NIR images in digital numbers (DN), which does not require vicarious radiometric calibration efforts as the reflectance images.

At 804 (e.g., fire grid classification), the main objective is to generate grids in an orthomosaic and classify them as fire and non-fire grids. $O_m$ can be divided into n equally spaced grids of dimensions x×y pixels. The size of the grid can be selected based on the size of the image, as shown in image 802. The fire grid classification can be achieved by quantifying the pixel distribution within each grid.

Figure 9:
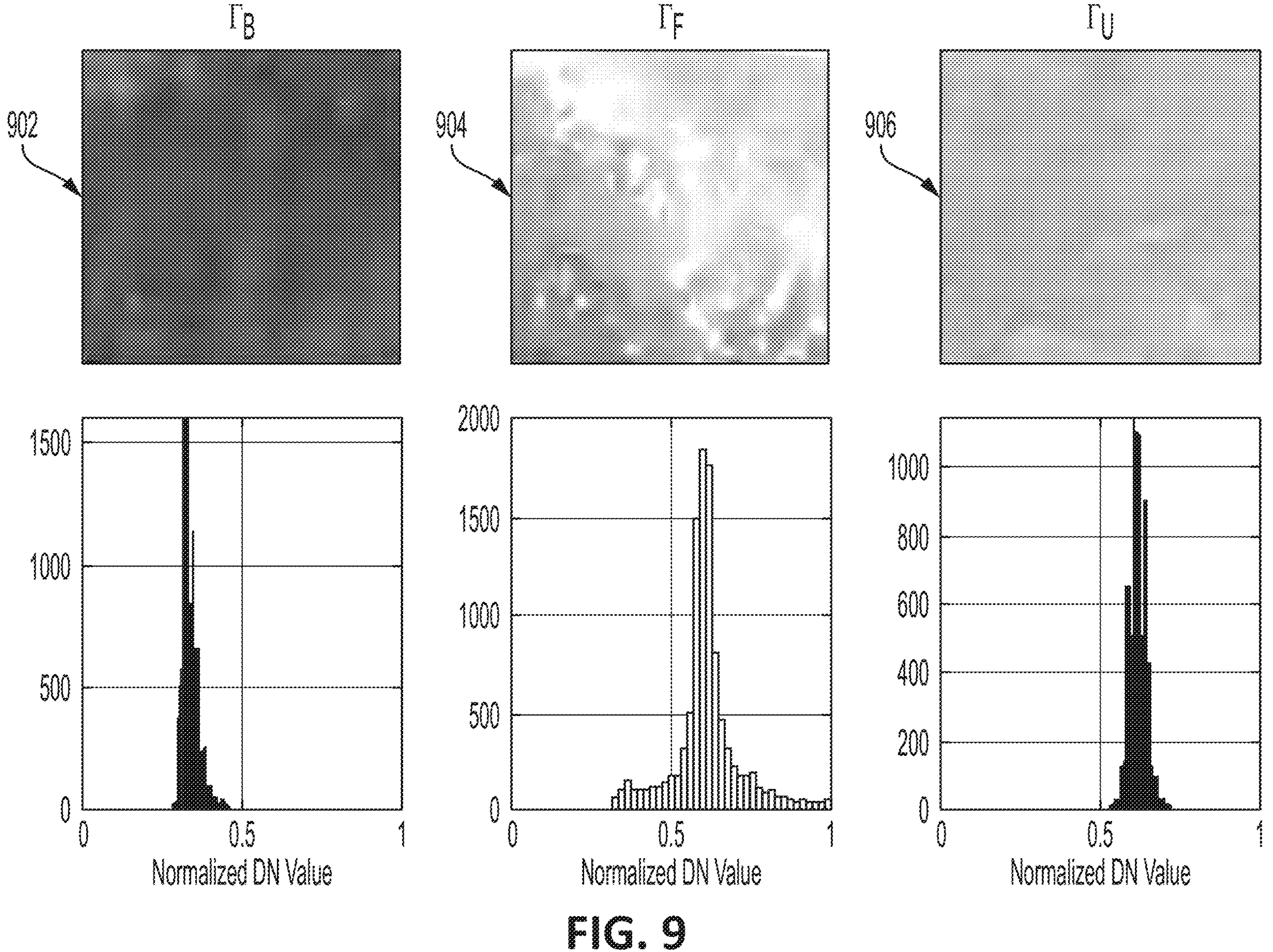
FIG. 9 is a diagram illustrating additional exemplary image processing techniques for boundary detection in accordance with aspects of the present disclosure.

One difference between the non-fire grids and fire grids, IF is that non-fire grids typically contain a lower pixel intensity values (or lower standard deviations), as they either represent burned areas (low-intensity values) or unburned areas (high intensity values), as illustrated in FIG. 9, where image 902 provides an example of a burned grid, image 904 provides an example of a fire grid, and image 906 provides an example of an unburned grid. Their respective histograms are shown below the images 902-906. It is noted that the images in FIG. 9 show the grids in normalized (0-1) DN values. In an aspect, the fire grid classification can be formulated as follows:

First, an orthomosaic ($O_m$) can be classified into non-fire grids and fire grids $\Gamma_F$ based on the distribution of all pixels enclosed within each grid. Two thresholds, α and β may be defined pertaining to the coefficient of variation (CV) and range (R) of each grid as the classification criteria. Here, $CV_\Gamma$ is defined as the ratio of standard deviation $\sigma_\Gamma$ and mean $\mu_\Gamma$ and $R_\Gamma$ is defined as the difference between the maximum and minimum pixel values within a grid Γ. The grids that satisfy the α and β criteria are classified as fire grids, $\Gamma_F$ with a value of 1, while all other grids are classified as non-fire grids with a value of 0. The grid may be determined according to Equation 2:

$$\Gamma = \begin{cases} 1, \text{ if } CV_\Gamma \geq \alpha \text{ and } R_\Gamma \geq \beta \\ 0, \text{ otherwise} \end{cases}, \text{ where, } CV_{\Gamma = \frac{\sigma_\Gamma}{\mu_\Gamma}\ and} R_\Gamma = \max(\Gamma) - \min(\Gamma). \tag{2}$$

In an aspect, an a threshold may be used to classify grids based on the extent of pixel intensity variability within the grid using the coefficient of variation CV. In an aspect, a can be selected as the mean CV of all the grids according to Equation 3:

$$\alpha = \frac{1}{n}\sum_{\Gamma=1}^{n} CV_r. \tag{3}$$

A β threshold may be used to classify grids based on the range of pixel intensity values within the grid. The β is determined empirically using the distribution of pixels in the orthomosaic $O_m$. The maximum pixel intensity value in $O_b$ corresponding to the burned areas is used to calculate β according to Equation 4:

$$\beta = 1 - \max(O_{m,B}) \tag{4}$$

where, $O_{m,B}$ denotes the pixels in $O_m$ that represent the burned areas (e.g., low-intensity).

By using the pixel intensity variation and range criteria the algorithm is able to observe the distribution of all the pixels within a grid and not just the minimum and maximum values. For example, if only the range criterion is used, grids with smoke occlusion or saturated pixels may wrongly be classified as fire grids.

Given the identified fire grids in an x×y pixels region, fire pixels within the identified fire grid regions may be used to extract the fire front. This may also be achieved using a pixel distribution within the fire grids. Since these grids exhibit a Gaussian distribution (shown in FIG. 9) and the maximum pixel values enclosed within them can be identified as fire pixels, a threshold γ can be defined based on the empirical rule of a Gaussian distribution. The pixels within each $\Gamma_F$ that satisfy the γ rule may be classified as fire pixels, which may be expressed as:

$$O_{m_f} = \begin{cases} 1, & \text{if } \Gamma_{F_{x,y}} \geq (\mu_{\Gamma_F} + \gamma\sigma_{\Gamma_F}) \\ 0, & \text{otherwise} \end{cases}$$

where, $\Gamma_F x, y$ is a pixel value at a geolocation (x, y) within a grid $\Gamma_F$ and $\gamma$ is an empirically selected value.

The value of $\gamma$ may be empirically selected between 2 and 3, where these values may correspond to values above 95% for the Gaussian distribution (e.g., 68-95-99.7 rule).

Figure 10:
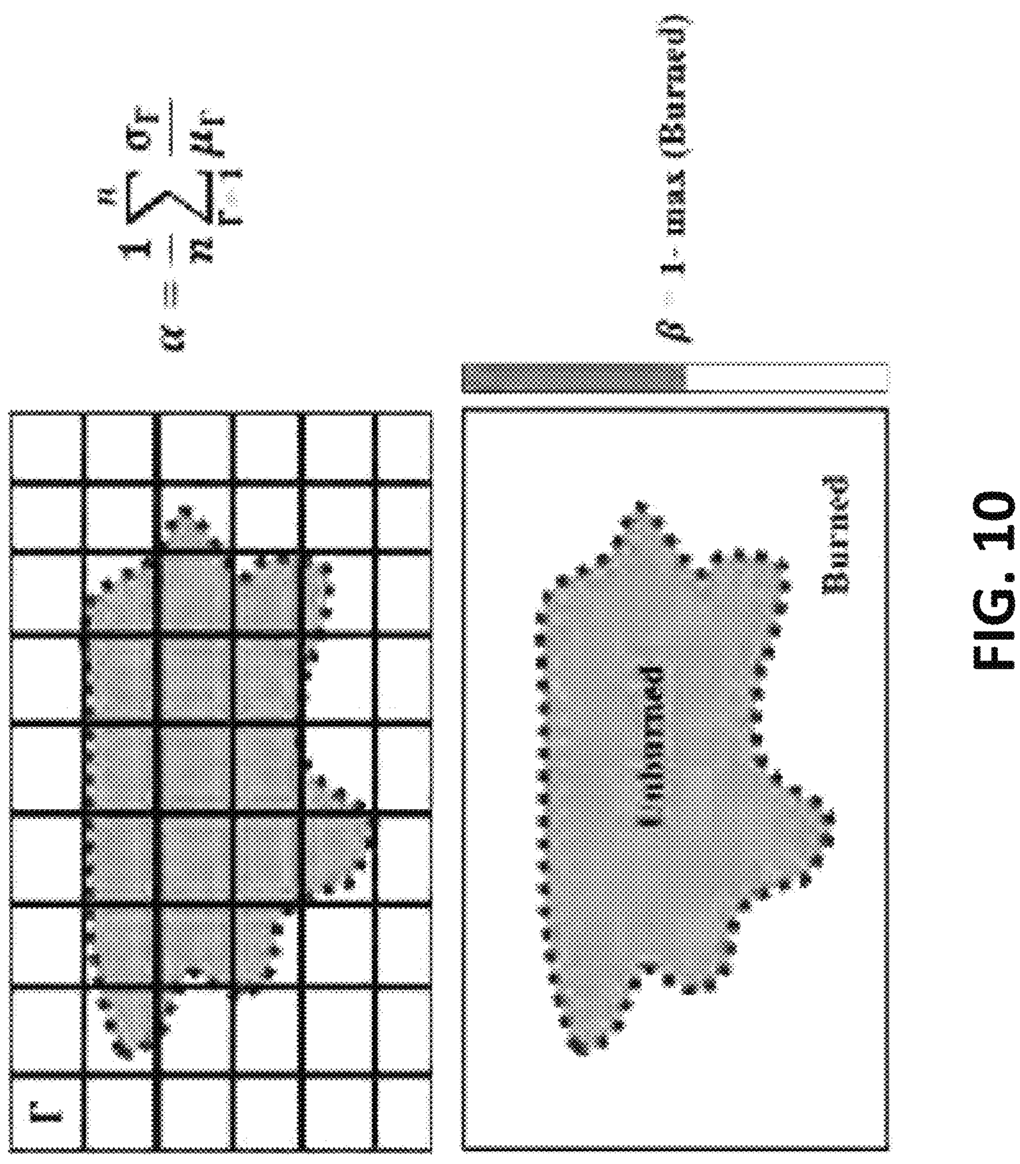
FIG. 10 is a diagram illustrating exemplary operations for using image processing techniques to detect a fire front in accordance with aspects of the present disclosure.

As illustrated in FIG. 10, the fire front extraction algorithm can isolate fire pixels that are often discrete and undesirable for later fire evolution mapping and ROS measurement. The extracted fire front pixels can be joined (e.g., automatically or manually) to form a continuous fire front curve for better representation, referred to herein as fire front delineation.

The delineated fire fronts from each orthomosaic may then be combined to form a fire evolution map. The main components of this map may include: the fire front locations, associated time labels, and their spread direction vectors. This process may be referred to as fire evolution mapping. For the spread direction vectors, a normal to the curve approach may be used, which is generally defined as the direction of the spread of a fire front. An example of such a map is shown in FIG. 11.

Figure 11:
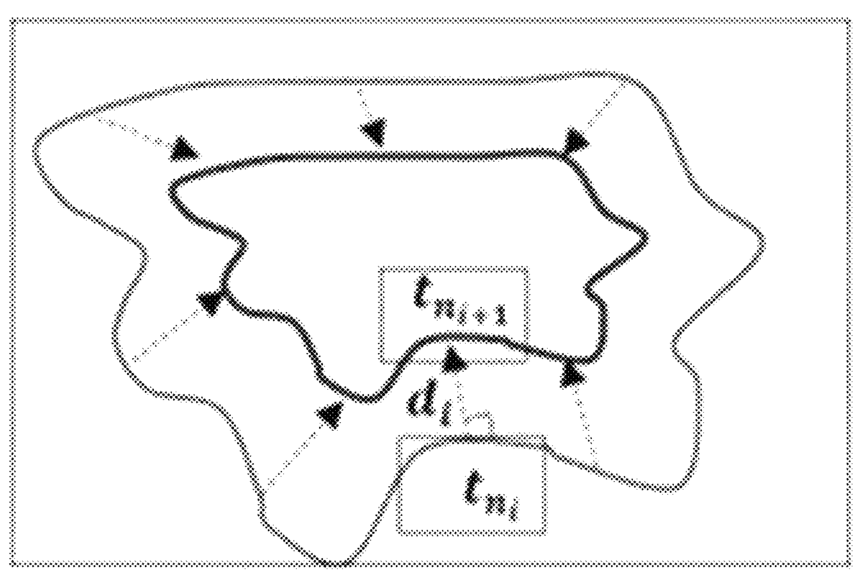
FIG. 11 is a diagram illustrating additional exemplary operations for using image processing techniques to rebuild the fire evolution and to calculate the evolution rate of spread in accordance with aspects of the present disclosure.

The fire evolution map contains the information required to calculate the ROS for any given point along a fire front, including the spread distance, di and the time difference, $(t_n i+1-t_n i)$, as shown in FIG. 11.

Figure 12:
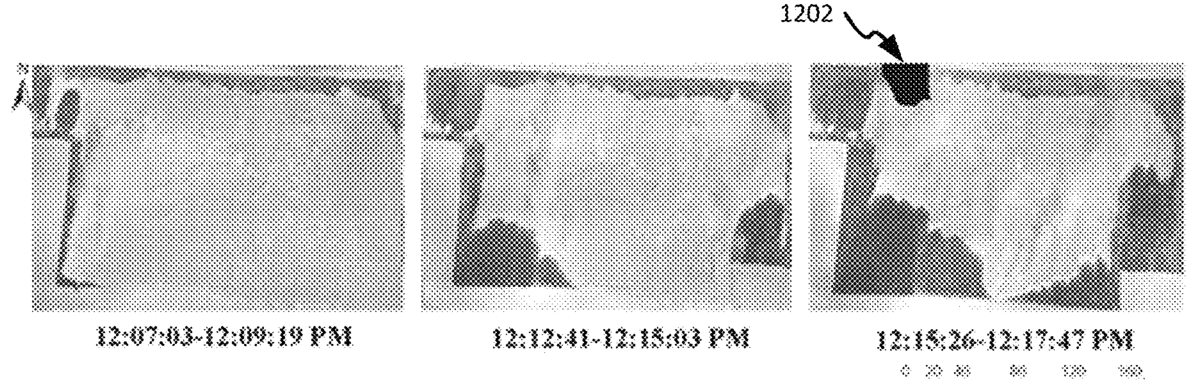
FIG. 12 is a diagram illustrating generation of example time-series orthomosaics in accordance with aspects of the present disclosure.
Figure 13:
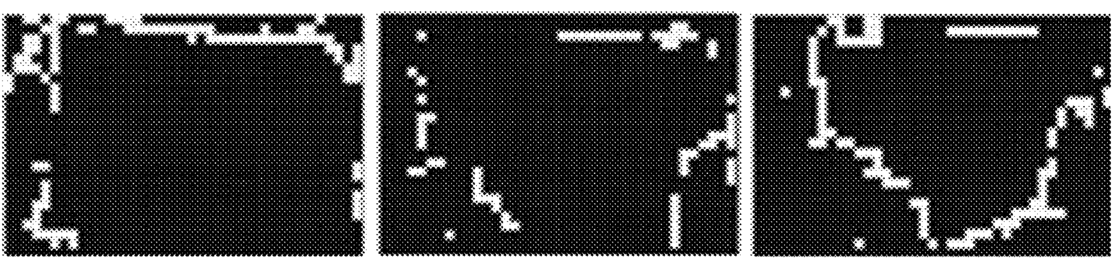
FIG. 13 is a diagram illustrating additional details (grid classification) related to image processing techniques in accordance with aspects of the present disclosure.

As explained above, repeat-pass individual frames may be extracted from the NIR video and grouped accordingly for the generation of short time-series orthomosaics as shown in FIG. 12. Each orthomosaic may be generated from about 120-150 images if using software such as Agisoft Photoscan Pro. Applying the time labelling descriptions and formulations to the prescribed fire described above, each orthomosaic was roughly divided into 190 m×110 m areas with a difference around 5 seconds. Table III, below, shows the number of images used and corresponding time intervals for each orthomosaic.

TABLE III

Short Time-Series NIR Orthomosaic Properties.

| Orthomosaic | Number of Images | Time Interval (Central) |
|---|---|---|
| $O_1$ | 147 | 12:07:03-12:09:19 PM |
| $O_2$ | 133 | 12:12:41-12:15:03 PM |
| $O_3$ | 119 | 12:15:26-12:17:47 PM |

The orthomosaics, which are shown in FIG. 12, were registered with a National Agriculture Imagery Program (NAIP) image with a spatial resolution of 1 m using the ArcGIS Georeferencing tool. Note that the NAIP image was acquired on Jun. 30, 2019, and had a 95% confidence accuracy of around 6 m. Control point pairs between each orthomosaic and the NAIP image were manually selected such that they covered the whole field. All the orthomosaics were registered using an Affine transformation and achieved a root mean square error (RMSE) of about 1.3 to 1.45 m, as shown below in Table IV.

TABLE IV

Image-to-Image Registration Attributes for Short Time-Series NIR Orthomosaics Using 1 m NAIP Imagery.

| Orthomosaic | Spatial Resolution (m) | Control Point Pairs | RMSE (m) |
|---|---|---|---|
| $O_1$ | 0.1 | 9 | 1.45 |
| $O_2$ | 0.1 | 9 | 1.3 |
| $O_3$ | 0.1 | 10 | 1.37 |

The proposed IVT method described above was then implemented on the registered NIR orthomosaics for fire front extraction. First, the registered orthomosaics were divided into equally spaced grids $\Gamma$ of size 100×100 pixels (e.g., 100 pixel grid size is used for computational convenience). Then, the pixel distribution within each grid $\Gamma$ was analyzed for fire grid classification. The NIR orthomosaics were normalized to 0-1 range, shown in FIG. 12. The $\alpha$ and $\beta$ are selected as 0.02 and 0.6 respectively. All the grids with CV greater than 0.02 and range greater than 0.6 were classified as fire grids, while all the other grids were classified as non-fire grids, as shown in FIG. 12.

Figure 14:
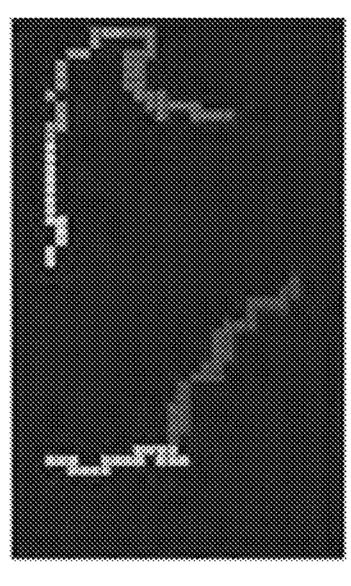
FIG. 14 shows diagrams comparing illustrating example time labeled orthomosaics in accordance with aspects of the present disclosure.
Figure 14:
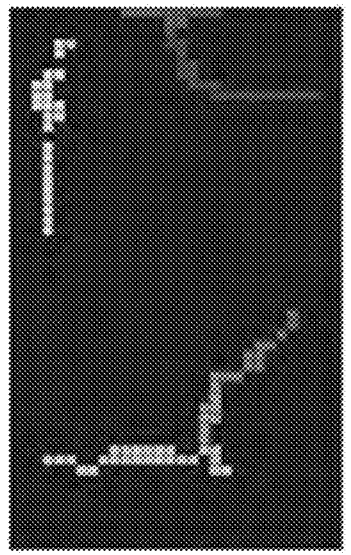
Figure 14:
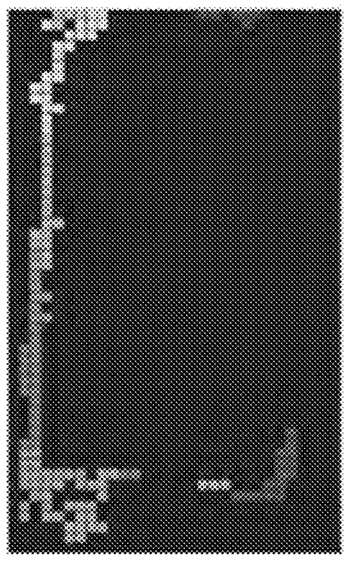

The fire grids were then searched for fire pixels using according to Equation (4), where all pixels within a grid that satisfy the $\gamma$ condition are classified as fire pixels and all other pixels were classified as non-fire pixels. It was found that the fire pixels within the classified fire grids represented the 95th percentile and above values. Therefore, $\gamma$ was selected to be 2 (e.g., based on the Gaussian distribution principle). FIG. 14 shows the extracted fire fronts from each orthomosaic. The fire front pixels were delineated using a line feature class in ArcGIS pro to form continuous fire front curves.

Figure 15:
FIG. 15 shows diagrams comparing Canny and LoG edge detection techniques to image processing techniques in accordance with aspects of the present disclosure.
Figure 15:
Figure 15:
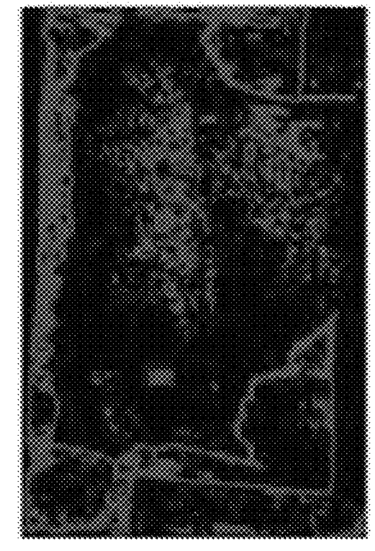

Qualitative and quantitative validation analyses were conducted to show the effectiveness of the proposed IVT method. For qualitative validation, popular edge detection methods including the Canny and LoG methods were applied to the NIR orthomosaics and the results were visually compared to those generated by the proposed method. The objective of this analysis was to illustrate the effectiveness of the proposed method in rejecting noisy pixels, such as saturated and smoke pixels, that are not often rejected by existing edge detection methods. The Canny, LoG edge detection, and the proposed IVT methods were applied to $O_2$ and the results are shown in FIG. 15, which shows Canny (left), LoG edge detection (middle), and the proposed IVT method (right). As is apparent in FIG. 15, the proposed IVT method performs better than the existing edge detection methods for fire front extraction from high-resolution (0.1 m) NIR DN images. One reason is that the IVT first identifies fire regions at a coarser resolution and then applies the fire front extraction algorithm to only those areas, thereby rejecting outliers that are often a problem when searching for the fire front directly in high-resolution images.

For quantitative validation, the IVT extracted fire fronts were compared to fire fronts manually extracted from the orthomosaics. The minimum distance between the manual and IVT fire fronts were then compared for error quantification. This analysis was conducted on all the NIR orthomosaics and the resulting errors are tabulated in Table V. It can be observed that the mean errors for each orthomosaic are less than or around 1 m. This error is reasonable and indicates the IVT methodology described herein is effective in accurately extracting the fire fronts.

TABLE V

Fire Front Error Statistics.

| Orthomosaic | Min | Mean | Max | Std. |
|---|---|---|---|---|
| $O_1$ | 0.01 | 0.46 | 1.61 | 0.35 |
| $O_2$ | 0.002 | 1.01 | 7.52 | 1.05 |
| $O_3$ | 0.002 | 1.01 | 3.52 | 1.05 |

Figure 16:
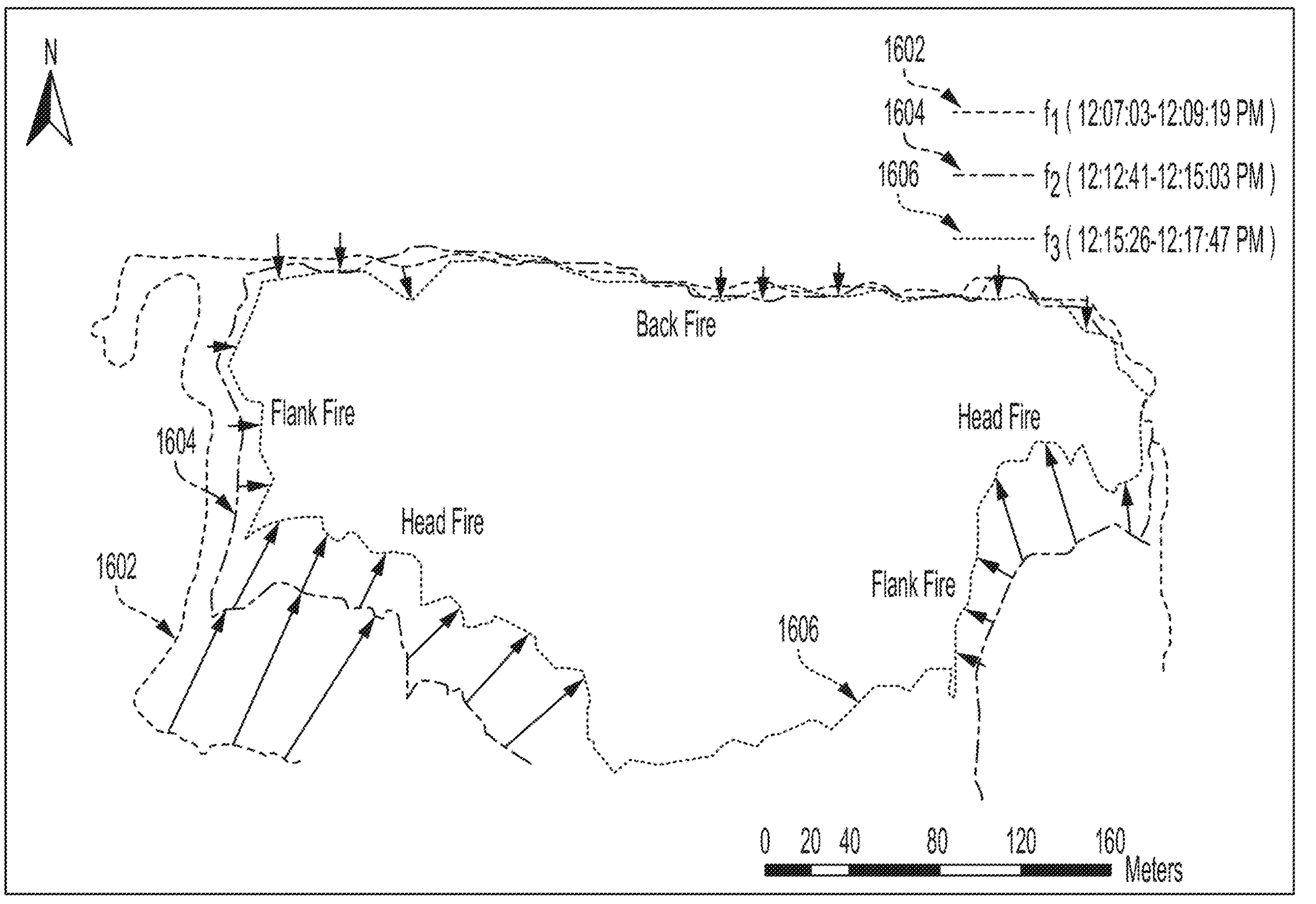
FIG. 16 is a diagram illustrating exemplary fire fronts extracted using image processing techniques in accordance with aspects of the present disclosure.

The extracted and delineated fire front curves, $f_1$, $f_2$, $f_3$ were then combined to form a fire evolution map that provides information about the fire front location, spread direction, and information for determining the ROS. FIG. 16 shows a fire evolution map generated based on fire front curves, $f_1$, $f_2$, $f_3$, where fire front 1606 corresponds to $f_1$, fire front 1604 corresponds to $f_2$, and fire front 1602 corresponds to $f_3$. FIG. 16 also includes labels defining the head fire, flank fire, and back fire generated in accordance with the concepts disclosed herein. Certain regions with stitching inconsistencies were excluded from the fire ROS analysis in FIG. 16, such as the west and east fire fronts of $f_1$, which were the overlapping areas of the two flight lines.

The fire fronts shown in FIG. 16 are categorized into head, flank, and back fires based on the spread directions. Since the prevailing wind during the fire were from the south at about 6.26 m/s (measured at around 2 m above the ground level), the fire fronts spreading north were categorized as the head fire, while the fire fronts spreading east or west are categorized as the flank fire, and the fire fronts spreading south are categorized as the back fire.

The fire fronts with defined spread vectors were used to calculate the ROS. For analysis, the head and flank fire fronts were divided into two categorizes based on spread direction, NE, NW for the head fire front and E, W for the flank fire front. It is noted that these categories indicate the direction towards which the fire front is spreading. For example, the portion of head fire front spreading towards the NE is categorized as a NE fire front. The back fire ROS was calculated between $f_1$ and $f_3$ and was calculated as described above, with the results tabulated in Table VI, Table VII, and Table VIII.

TABLE VI

Head Fire ROS Statistics (unit: m/s).

| Fire Fronts | Min | Mean | Max | Std. |
|---|---|---|---|---|
| f1-f2NE | 0.21 | 0.24 | 0.25 | 0.016 |
| f2-f3NE | 0.18 | 0.26 | 0.35 | 0.05 |
| f2-f3NW | 0.27 | 0.45 | 0.44 | 0.07 |
| Cumulative | | | | |
| | 0.18 | 0.28 | 0.44 | 0.07 |

TABLE VII

Flank Fire ROS Statistics (unit: m/s).

| Fire Fronts | Min | Mean | Max | Std. |
|---|---|---|---|---|
| $f_1$-$f_2$E | 0.04 | 0.06 | 0.07 | 0.001 |
| $f_2$-$f_3$E | 0.03 | 0.06 | 0.09 | 0.02 |
| $f_2$-$f_3$W | 0.02 | 0.1 | 0.2 | 0.06 |
| Cumulative | | | | |
| | 0.02 | 0.1 | 0.2 | 0.06 |

TABLE VIII

Back Fire ROS Statistics (unit: m/s).

| Fire Fronts | Min | Mean | Max | Std. |
|---|---|---|---|---|
| $f_1$-$f_3$ | 0.0136 | 0.025 | 0.0435 | 0.0106 |

Figure 17:
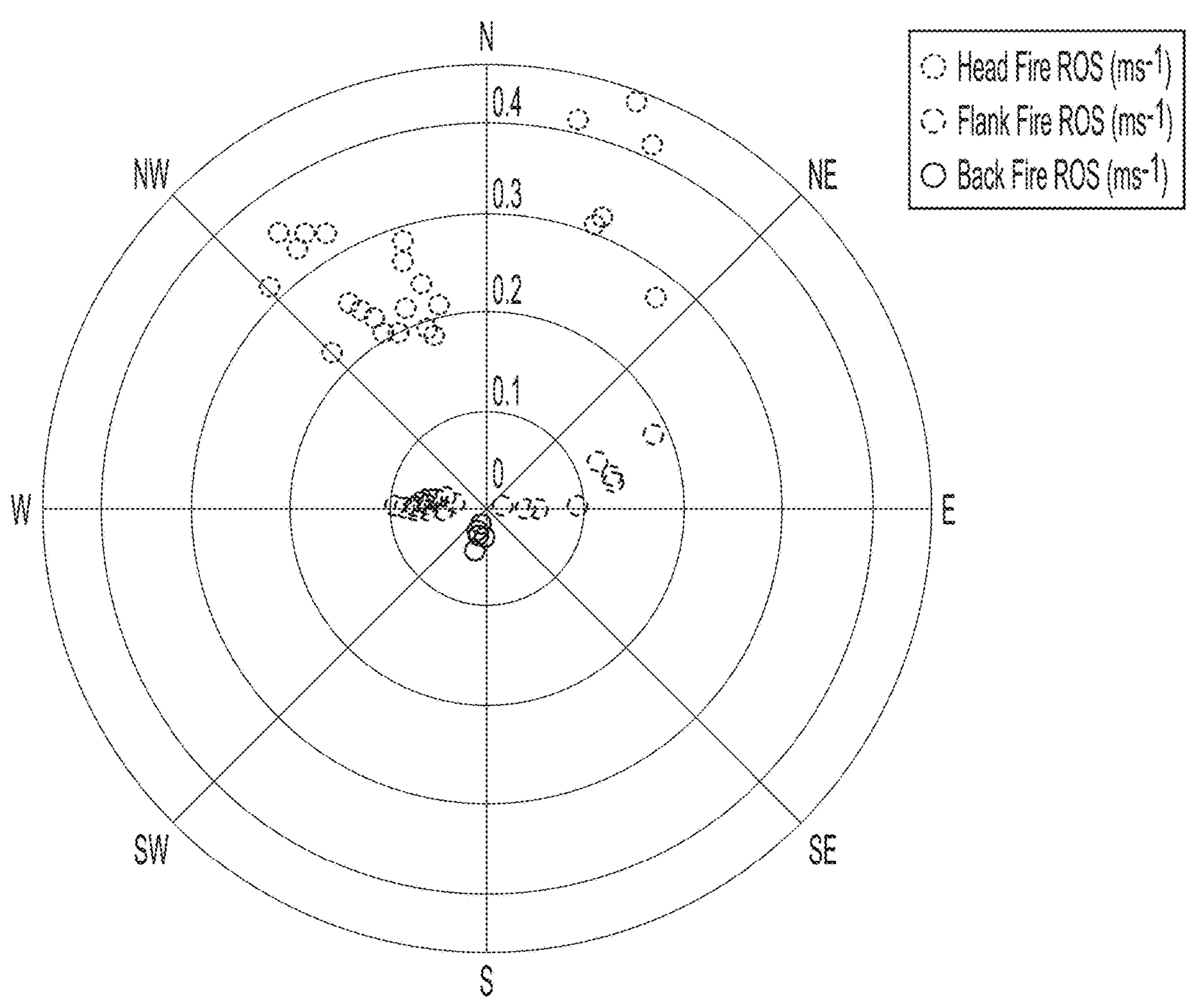
FIG. 17 is a polar plot illustrating exemplary fire rates of spread using image processing techniques in accordance with aspects of the present disclosure.

As can be seen in the Tables above, the mean head fire, flank fire, and back fire ROS are measured to be 0.28 m/s, 0.1 m/s, and 0.025 m/s respectively. The measured ROS may be further visualized in a polar plot, as shown in FIG. 17.

There exist several challenges in evaluating and analyzing the accuracy of the proposed spatiotemporal representation, including handling multiple overlapping aerial images observing the same grid and accurate labeling of fire front location. For the above-described UAS fire data set, the fire front in one grid may show up in about 7 overlapping images on average (~0.7 seconds time difference between two consecutive images), which increases the challenge with respect to time and spatial accuracy analysis within each fire front grid. The 0.7 second difference was mostly determined by the longitudinal overlapping percentage of the orthomap, the camera frames per second (fps), and the UAS ground speed. For the data set, the time difference in 7 overlapped images may result in about ±2.5 seconds uncertainty in time. Since the UAS flies much faster (~25 m/s) than the fire spread (0.01-0.4 m/s), it may be assumed that the movement of the fire is trivial within the overlapped pictures. Second, manual corrections of fire labeling may be used since fire lines identified by the above described IVT method may generate minor errors, especially when the fire front is at the boundary of the grid. However, the correction may only shift the fire front one grid away from the identified fire front. Finally, the acquired time stamp information using the proposed spatiotemporal representation was compared with the ones derived using the manual approach based on the thermal image dataset from the same prescribed fire. The average time difference between spatiotemporal representation and the manual approach is 0.88 sec., which falls in the ±2.5 seconds uncertainty bound.

The accuracy of the fire ROS measurements can be important to wildfire management, such as for prescribed fire planning and policy making, and fire behavior model validation. The fire ROS accuracy of the techniques disclosed herein was analyzed from three sides, uncertainty analysis, literature data, and cross validation with thermal data. The uncertainty of the disclosed fire ROS measurements described herein comes from both the fire front location and the elapsed time between the two fire front lines. The spatial position accuracy of the NIR fire front location is about 1.45 m (RMS, 1-$\sigma$). Assuming the elapsed time between two fire lines is around 120 seconds, the fire ROS uncertainty will be around 0.024 m/s. This means the head fire and flank fire ROS estimates are fairly accurate while the back fire ROS may need further confirmation. In addition, the measured grass fire ROS matches with the expected grass fire behavior in Kansas based on NWS researchers' former work where a fire ROS of 0.18/0.36 m/s corresponds to a grass fire danger index of 5/10 with moderate/high difficulty of suppression. Considering the strong prevailing wind velocity that day (~6 m/s), it is not surprising that the fire danger was relatively high. Finally, the NIR derived fire ROS estimates agree with the thermal derived fire ROS from the same prescribed fire. The mean head fire and flank fire ROS for thermal data were measured to be 0.27 and 0.11 m/s [24], which have a 0.01 m/s difference for both data and are within the 0.024 m/s uncertainty bound.

The accuracy of UAS derived fire maps (for example, FIG. 16) may be affected by the quality of the aerial images and corresponding GPS location data collected by the UAS when flying over an evolving fire. The quality of this data may also be affected by many UAS flight performance metrics, such as orientation tracking errors, flight speed, UAS flight trajectory, and the specification and setting of sensing payloads (e.g., cameras and GPS). Two of these factors, the UAS flight trajectory and the sensor accuracy, are discussed in detail below.

Fire missions designed for accurate fire mapping and fire ROS measurement require high-quality observations of the fire front at regular time intervals, which can be used to generate consistent time-series orthomosaics. For prescribed fire experiments (e.g., similar to the Anderson County grass fire described above), an ideal UAS flight trajectory would be to fly wings-level and steady in consistent loops over the fire field at regular time intervals while capturing images of the burning field. For example, a UAS may be flown over the same fire front at time $t_0$, $t_1=t_0+\delta t$, and so on, where $\delta t$ is the time taken by the UAS to complete one loop. This way, the UAS can capture the evolution of fire fronts in the region at regular time intervals which can be used for fire metrics measurements, such as fire ROS. However, such a flight trajectory can be difficult to achieve due to multiple reasons, such as irregular fire evolution patterns and fire-induced turbulence, such as thermals. Fire-generated weather can also affect the orientation of the UAS, which can consequently result in the capturing of oblique and blurry images that may not be usable in the orthomosaic stitching. An example of such a scenario can be seen in the rightmost image in FIG. 12, where a gap 1202 of this image was caused by rejecting blurry images (due to oscillating UAS roll angles during capture) from the stitching process.

The properties of the operable sensing payload, such as cameras and GPS, may also play a role in the accuracy of UAS data derived fire metrics. For example, camera properties include frames per second (fps), image resolution, and field of view (FOV). Higher fps can achieve more frequent observations of the fire, while higher image resolution and FOV can achieve better spatial representations of the burning field. Spectral properties of the images may also play a role in the accuracy of the delineated fire front locations. For example, fire fronts within thermal images may be easier to delineate than those in NIR images, while NIR images are less susceptible to smoke occlusion than RGB images and are sensitive to the charring of vegetation in the burning field. The IVT method proposed above is able to extract the fire front from NIR images using this property. It is worth mentioning that these camera properties may only affect the accuracy of fire front locations in the image coordinate frame. The locations and the ROS of the extracted fire fronts in the world coordinate frame (e.g., latitude and longitude) are directly affected by the accuracy of the GPS data onboard the UAS. This can be overcome by using cm-level RTK GPS or by performing image-to-image registration using reference images. As explained above, the resulting fire maps are accurate up to 1.5 m since the time-series orthomosaics were registered using a 1-m NAIP reference image.

The NIR-based mapping and ROS measurement techniques described herein that utilize UAS short time-series orthomosaics with time labels enables low-cost NIR cameras to be used instead of expensive thermal cameras, which provides a feasible way to perform mapping and ROS measurement for many UAS operators. Moreover, the proposed method can utilize DN images and does not require vicarious radiometric calibrations that can be challenging for UAS images. The above-described methodology may be used and/or extended to perform fully automatic fire front detection (e.g., by using supervised learning and computer vision models to interpret the image data), which may provide a mechanism for performing real-time fire mapping and ROS measurement for better fire situation awareness. In an aspect, information observed or extracted using the above-described techniques may also be used to improve the data acquisition process, such as to make autonomous UAS path adjustments based on onboard fire spread measurements. In another aspect, a cm-level RTK GPS may be deployed on-board the UAS for improved orthorectification.

Having generally described a framework and use case to which the concepts described herein may be applied, further details regarding the imaging and mapping techniques of the present disclosure will not be described. It is to be appreciated that the above-described use case related to fire spread has been provided for purposes of illustration, rather than by way of limitation and that the imaging, mapping, and ROS measurement techniques may be used for other use cases and applications, such as flooding.

Figure 2:
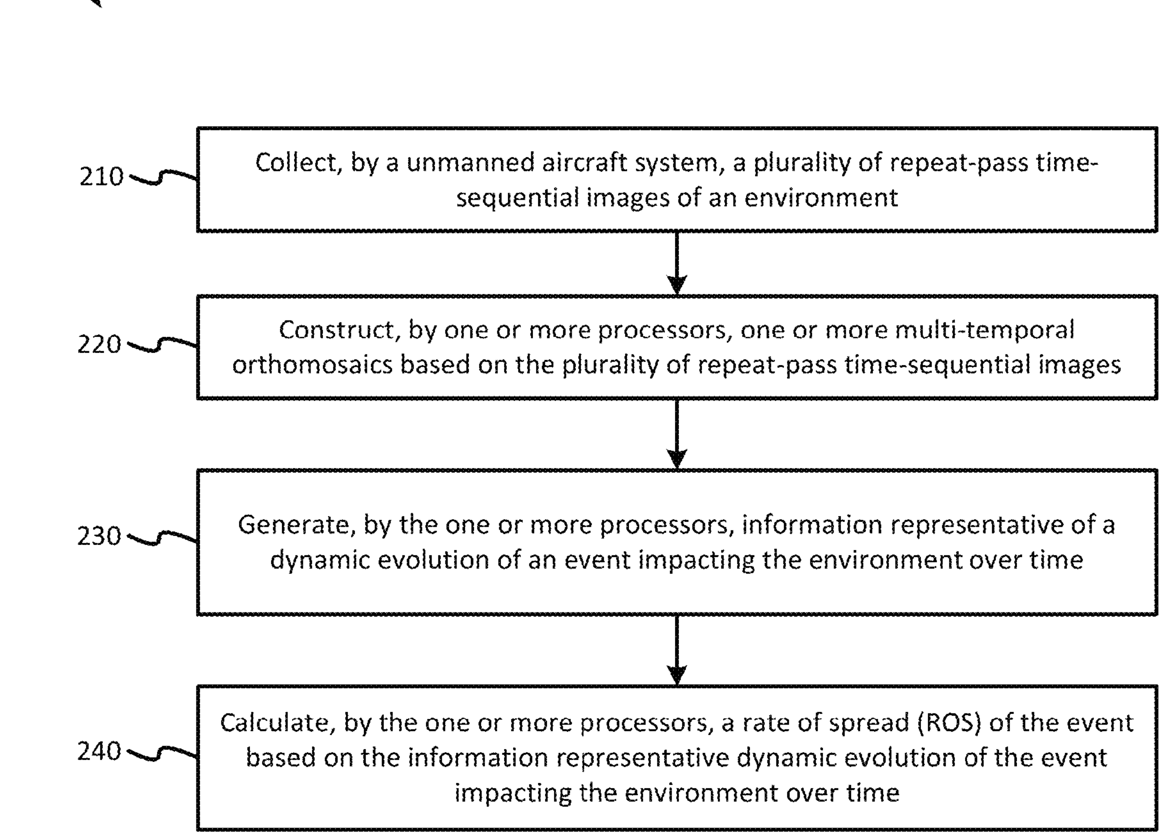
FIG. 2 is a flow chart illustrating an exemplary method for analyzing and mapping geographic areas using UAS in accordance with aspects of the present disclosure.

Referring to FIG. 2, a flow chart illustrating an exemplary method for analyzing and mapping geographic areas using UAS in accordance with aspects of the present disclosure is shown as a method 200. In an embodiment, the method 200 may be performed using a system, such as the system 100 shown in FIG. 1. At step 210, the method 200 includes collecting, by an UAS, a plurality of repeat-pass time-sequential images of an environment. Each image of the plurality of repeat-pass time-sequential images may be associated with a particular area of the environment and a timestamp. At step 220, the method 200 includes constructing, by one or more processors, one or more multi-temporal orthomosaics based on the plurality of repeat-pass time-sequential images. At step 230, the method 200 includes generating, by the one or more processors, information representative of a dynamic evolution of an event impacting the environment over time. At step 240, the method 200 includes calculating, by the one or more processors, a rate of spread (ROS) of the event based on the information representative dynamic evolution of an event impacting the environment over time.

As can be appreciated from the description above, the system 100 of FIG. 1 and the method 200 of FIG. 2, as well as the various illustrative examples described with reference to FIGS. 3-18, the concepts described herein may be utilized to enhance details associated with satellite images, such as to detect and identify geographic regions that have been impacted by events, such as a tornado, a fire, a hailstorm, an earthquake, another type of event, or a combination thereof. However, it is to be appreciated that the concepts described herein may also be utilized to enhance images or maps generated with satellite imaging techniques, such as to increase the resolution of specific geographic areas of a satellite image. Accordingly, the techniques described herein should be understood to be applicable to use cases involving enhancement and analysis of images of geographic areas for purposes related to natural disasters as well as for other, non-natural disaster related purposes.

It is noted that the above-described functionality provided by the system 100 of FIG. 1 and the method 200 of FIG. 2, as well as other features and functionality described herein, may be embodied a software program or system (e.g., for performing UAS-based data processing, analysis, and visualization), such as for prescribed fire or wildfire management. It is noted that the software or system may be configured to support near real-time fire monitoring and post-event reconstruction and assessment. Exemplary functions provided by the software or system may include fire perimeter mapping, fire rate of spread measurement, fuel type classification, fuel load and moisture estimation, wind estimation, and fire spread prediction. As described herein, the system may receive inputs from UAS, satellite, and ground instruments, as well as other sources of data and information that may be utilized to support the concepts described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the drawings include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method comprising:

collecting, by an unmanned aircraft system, a plurality of repeat-pass time-sequential images of an environment, wherein each image of the plurality of repeat-pass time-sequential images is associated with a particular area of the environment and a timestamp;

constructing, by one or more processors, one or more multi-temporal orthomosaics based on the plurality of repeat-pass time-sequential images;

generating, by the one or more processors, information representative of a dynamic evolution of a fire impacting the environment over time based on the one or more multi-temporal orthomosaics, wherein the generating the information representative of the dynamic evolution of the fire includes:

generating a grid of pixels for each of the one or more multi-temporal orthomosaics;

classifying, for each pixel of the grid of pixels, whether the pixel represents a fire front based on the pixel meeting an intensity variance threshold; and generating, by performing a delineation on those pixels of the grid of pixels classified to represent the fire front, a fire front curve; and calculating, by the one or more processors, a rate of spread (ROS) of the fire based on the information representative of the dynamic evolution of the fire impacting the environment over time.

2. The method of claim 1, the method further comprising:

extracting a fire front from each of the one or more multi-temporal orthomosaics to generate a plurality of fire fronts;

generating the fire front curve based on the plurality of fire fronts; and determining the ROS based at least in part on the fire front curve.

3. The method of claim 1, wherein the generating the fire front curve comprises:

extracting the pixels classified as representing the fire front to produce an initial fire front; and performing the delineation on the initial fire front to obtain the fire front curve.

4. The method of claim 1, wherein the intensity variance threshold is determined based on a pixel intensity metric obtained from the grid of pixels.

5. The method of claim 1, wherein intensity variance threshold is determined based on a range of pixel intensity values of the grid of pixels.

6. The method of claim 1, wherein the fire front curve is determined based on a plurality of fire fronts extracted from the one or more multi-temporal orthomosaics, and wherein the ROS is determined based on the fire front curve.

7. The method of claim 1, further comprising generating a fire evolution map based on the fire front curve.

8. The method of claim 1, further comprising registering an area of the one or more multi-temporal orthomosaics with respect to a calibrated image.

9. The method of claim 8, further comprising enhancing the calibrated image based on image content included in at least one of the one or more multi-temporal orthomosaics.

10. The method of claim 1, wherein the intensity variance threshold is determined based on a pixel intensity metric obtained from the grid of pixels and based on a range of pixel intensity values of the grid of pixels.

11. A non-transitory computer-readable storage medium storing instructions that, when executed by one or more processors, cause the one or more processors to perform operations comprising:

receiving a plurality of repeat-pass time-sequential images of an environment collected by an unmanned aircraft system, wherein each image of the plurality of repeat-pass time-sequential images is associated with a particular area of the environment and a timestamp;

constructing one or more multi-temporal orthomosaics based on the plurality of repeat-pass time-sequential images;

generating information representative of a dynamic evolution of a fire impacting the environment over time based on the one or more multi-temporal orthomosaics, wherein the generating the information representative of the dynamic evolution of the fire includes:

generating a grid of pixels for each of the one or more multi-temporal orthomosaics;

classifying, for each pixel of the grid of pixels, whether the pixel represents a fire front based on the pixel meeting an intensity variance threshold; and generating, by performing a delineation on those pixels of the grid of pixels classified to represent the fire front, a fire front curve; and calculating, by the one or more processors, a rate of spread (ROS) of the fire based on the information representative of the dynamic evolution of the fire impacting the environment over time.

12. The non-transitory computer-readable storage medium of claim 11, the operations further comprising:

extracting a fire front from each of the one or more multi-temporal orthomosaics to generate a plurality of fire fronts;

generating the fire front curve based on the plurality of fire fronts; and determining the ROS based at least in part on the fire front curve.

13. The non-transitory computer-readable storage medium of claim 12, wherein the generating the fire front curve comprises:

extracting the pixels classified as representing the fire front to produce an initial fire front; and performing the delineation on the initial fire front to obtain the fire front curve.

14. The non-transitory computer-readable storage medium of claim 11, wherein the intensity variance threshold is determined based on a pixel intensity metric obtained from the grid of pixels and based on a range of pixel intensity values of the grid of pixels.

15. The non-transitory computer-readable storage medium of claim 11, wherein the fire front curve is determined based on a plurality of fire fronts extracted from the one or more multi-temporal orthomosaics, and wherein the ROS is determined based on the fire front curve.

16. The non-transitory computer-readable storage medium of claim 11, the operations further comprising generating a fire evolution map based on the fire front curve.

17. The non-transitory computer-readable storage medium of claim 11, the operations further comprising registering an area of the one or more multi-temporal orthomosaics with respect to a calibrated image.

18. The non-transitory computer-readable storage medium of claim 17, the operations further comprising enhancing the calibrated image based on image content included in at least one of the one or more multi-temporal orthomosaics.

* * * * *